United States Patent
Kairali et al.

(10) Patent No.: US 12,387,255 B2
(45) Date of Patent: Aug. 12, 2025

(54) ARTIFICIAL INTELLIGENCE-GENERATED SUGGESTION FOR ITEM REPLACEMENT

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 325 days.

(21) Appl. No.: 18/165,507

(22) Filed: Feb. 7, 2023

(65) Prior Publication Data

US 2024/0265436 A1    Aug. 8, 2024

(51) Int. Cl.
| | |
|---|---|
| G06Q 30/00 | (2023.01) |
| G06Q 30/0601 | (2023.01) |
| G06T 17/00 | (2006.01) |
| H04N 5/265 | (2006.01) |

(52) U.S. Cl.
CPC ..... *G06Q 30/0643* (2013.01); *G06Q 30/0627* (2013.01); *G06Q 30/0629* (2013.01); *G06Q 30/0631* (2013.01); *G06T 17/00* (2013.01); *H04N 5/265* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 11,232,329 B2 | 1/2022 | Choi | |
| 2019/0266656 A1* | 8/2019 | Watkins | G06Q 30/0631 |
| 2020/0175565 A1* | 6/2020 | Ishiguro | G06Q 30/06 |
| 2021/0133850 A1* | 5/2021 | Ayush | G06V 10/945 |
| 2021/0358015 A1 | 11/2021 | Isaacson | |
| 2021/0383457 A1 | 12/2021 | Vaananen | |

FOREIGN PATENT DOCUMENTS

CN    110163392 A    8/2019

OTHER PUBLICATIONS

Disclosed Anonymously, "Intelligent Meal Service Management System suggesting filters in menu for the event," IP.com Prior Art Database Technical Disclosure, IP.com No. IPCOM000259102D, Jul. 12, 2019, 5 pages.
Invrsion, "ShelfZone® VR shopping experience by inVRsion—English version," YouTube, video posted May 2016, Accessed: Jan. 4, 2023, https://www.youtube.com/watch?v=-2UT2KcnJiE, 8 pages.
Sync Media Network, " This is how #Walmart envisions Shopping in the #Metaverse. #shopping," YouTube, video posted Jan. 2022, Accessed: Jan. 4, 2023, https://www.youtube.com/watch?v=u6UYGwPaLf8, 4 pages.

* cited by examiner

*Primary Examiner* — Ethan D Civan
(74) *Attorney, Agent, or Firm* — Caleb D. Wilkes

(57) ABSTRACT

A computer-implemented method, a computer system, and a computer program product are provided. A first computer receives first data from a first sensor associated with a first user. The first computer uses artificial intelligence to generate a first recommendation for a replacement object for the first user. The generating is based on the first data. The first recommendation indicates ability of the replacement object to replace a first object associated with the first user. The first computer transmits the first recommendation for presentation to the first user.

20 Claims, 7 Drawing Sheets

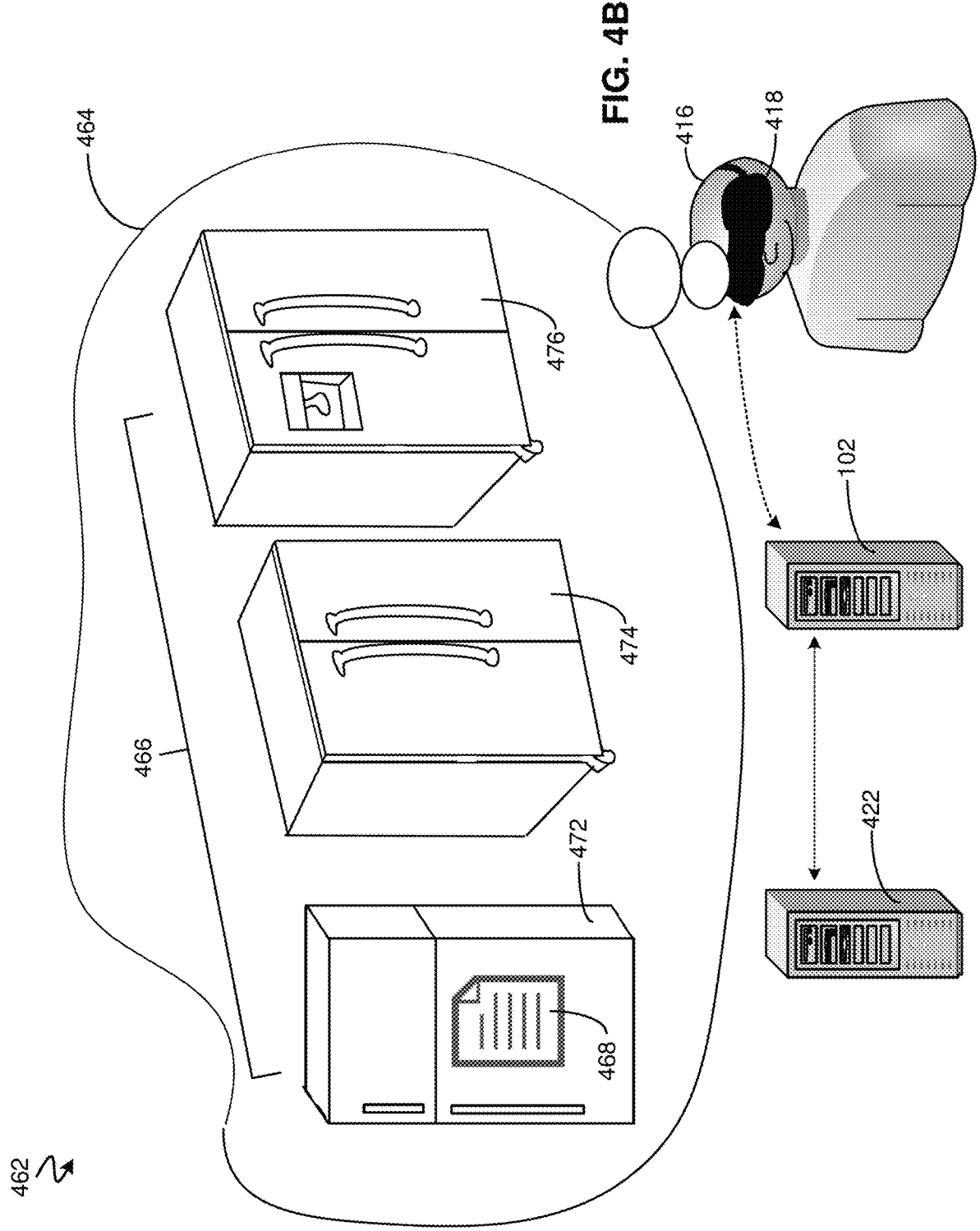

ARTIFICIAL INTELLIGENCE-GENERATED SUGGESTION FOR ITEM REPLACEMENT

BACKGROUND

The present invention relates generally to technologies such as computers, cameras, physiological sensors, Internet-of-Things sensors, artificial intelligence, augmented reality, and virtual reality and harnessing these technologies to provide an automated system for generating suggestions for replacing an item.

Modern consumers often have many sensors operating in their own personal environment that gather data for the consumer. With numerous objects available for a user for retrieval and/or acquisition, navigating through the large amounts of data can be time consuming and confusing for a user to make a decision about finding a new object to replace an old object.

"Intelligent Meal Service Management System suggesting filters in menu for the event" from ip.com article IPCOM000259102D (anonymous authors) discloses a system to review a guest list and their food preferences, suggest the most suitable menu and time to serve different guests' groups according to their food choices, using a camera to monitor change in guest's numbers and analyzing facial expressions of the guests having the food to determine their liking of the dishes served, and helping kitchen make decisions about served portion sizes to cater to demand.

US 2021/0383457 A1 by Vaananen relates to a self-shopping refrigerator with a light and a camera that captures images of contents of the refrigerator and can analyze the photographs for determining food quantity, food quality, or type of food and use derived information for advising on the diet of a human and/or mammal and for identifying deficiencies in the contents of the refrigerator.

U.S. Pat. No. 11,232,329 B1 to Choi et al. relates to a refrigerator with a camera for taking pictures to determine entry and exits of food items and providing information about preferred food for a classified user based on the retrieved entry/exit history of the food.

US 2021/0358015 A1 by Isaacson et al. relates to a social media shopping experience that includes receiving a posting from the social networking entity and presenting a product associated with the posting in a newsfeed for the user with an associated option to buy.

A need exists for automation and artificial intelligence to harness the data retrieved from sensors in the environment of a person to help the person more efficiently and expeditiously make choices about object replacement. A need exists for automation and artificial intelligence to harness sensor data to help users restore their satisfaction levels that have dipped due to poor performance by objects. A need exists for automation and artificial intelligence to harness data to help users better appreciate item choices which will be compatible with their current environment.

SUMMARY

A computer-implemented is provided and includes a first computer receiving first data from a first sensor associated with a first user. The first computer uses artificial intelligence to generate a first recommendation for a replacement object for the first user. The generating is based on the first data. The first recommendation indicates ability of the replacement object to replace a first object associated with the first user. The first computer transmits the first recommendation for presentation to the first user. A computer system and a computer program product corresponding to this method are also provided herein.

In this way, automation and artificial intelligence harness data retrieved from sensors in an environment of a person to help the person more efficiently and expeditiously make choices about object replacement.

In some additional embodiments, the generating of a recommendation includes analyzing the first data to generate a digital specification of the first object and comparing the digital specification to the replacement object to determine the ability of the replacement object to replace the first object. The recommendation may also include an analysis of compatibility of the second object with surroundings of the first object such that the second object is able to replace the first object in the surroundings.

In this way, automation and artificial intelligence help harness data so that a user is better able to receive suggestions for item choices which will be compatible with their current environment.

In some additional embodiments, the received data relates to a first activity associated with the first user. The first data is analyzed to determine (1) that the first object is associated with the first activity and (2) a satisfaction level of the first user for the first activity. The generating the first recommendation is performed in response to the satisfaction level being below a pre-determined threshold level. The generating the first recommendation includes determining a user satisfaction level of the replacement object. The generating the first recommendation is based on the user satisfaction level that is associated with the replacement object exceeding the determined satisfaction level of the first user.

In this way, automation and artificial intelligence harnesses sensor data to help users restore their satisfaction levels that have dipped due to poor performance by objects.

In at least some embodiments, the presentation includes a virtual reality display of the first recommendation. The virtual reality display includes overlaying the first recommendation over a portion of a view of a virtual reality collection of items. The first recommendation may include a depiction of the replacement object and the depiction may be overlayed over the portion of the view of the virtual reality collection of items. The depiction of the replacement object may be overlayed over a depiction of the first object.

In this way, artificial intelligence and computer technology help users receive an opportunity to better visualize recommendations for new objects, how the recommendations relate to the object that the user wants to replace, and how the new object would fit into an environment of the user.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 4B illustrates virtual reality display of replacement item suggestions according to another embodiment.

DETAILED DESCRIPTION

Figure 1:
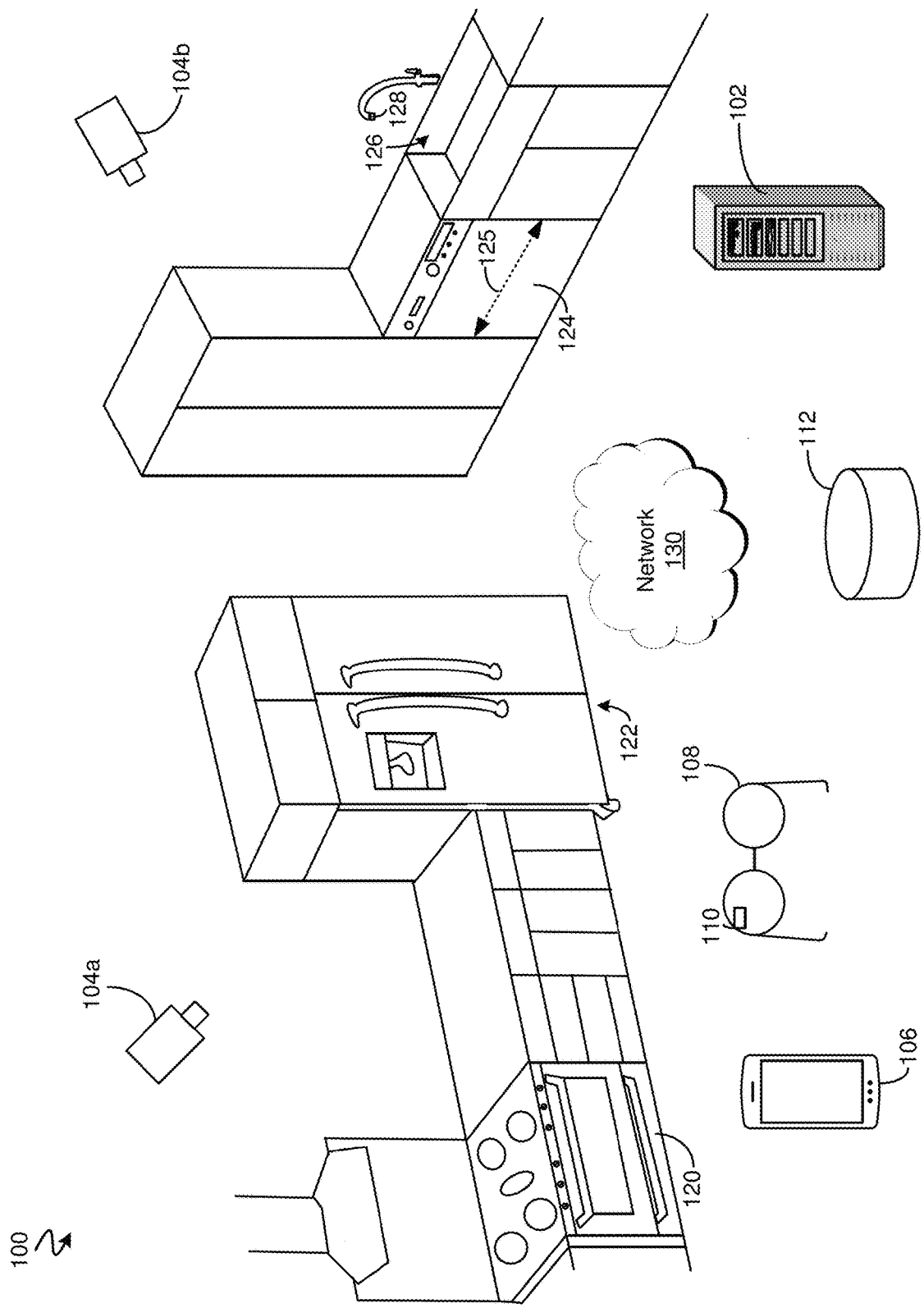
FIG. 1 illustrates a networked computer environment for generating item replacement suggestions according to at least one embodiment.

Detailed embodiments of the claimed structures and methods are disclosed herein;

however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for generating, in an automated manner, a suggestion to a user for replacing an item. The user may have experienced dissatisfaction with a particular item. The item itself might have broken or reduced its performance. The system may use artificial intelligence to analyze data that is received by sensors in the environment of a user. Via the analysis, the artificial intelligence may identify other items which could successfully replace a first item. Such a replacement may improve a satisfaction level of a user. The artificial intelligence may identify one or more items to suggest for replacement by comparing satisfaction levels of users who have used the potential replacement items and/or by comparing replaceability of the first item with various potential replacement items. Various sensors such as cameras, physiological tracking sensors, electric sensors, Internet-of-Things sensors, etc. may be used to gather data to determine when a suggestion for item replacement is to be generated, for which items a replacement should be found, and which items are suitable to replace the currently used/installed items. The present embodiments harness a variety of technologies such as computers, cameras, physiological sensors, Internet-of-Things sensors, artificial intelligence, augmented reality, and virtual reality to help achieve these objectives. The present embodiments provide an improvement in the artificial intelligence field of automated computer assistance because the automated computer assistance receives and interprets sensor data to help identify items to replace and to identify appropriate items to suggest for replacing those items that need replacement. This automated suggestion generation may occur to supplement the usual automated computer assistance in which an automated computer assistant responds to direct instructions from a user. Thus, the present embodiments may be paired with virtual/smart assistants to enhance the performance abilities of the virtual/smart assistants. The present embodiments include using artificial intelligence to generate, for replacing a first object, a recommendation indicating ability of the replacement object to replace the first object.

The present embodiments may perform one or more of machine learning, object recognition, pattern recognition, etc. in order to determine what items are being used by a user, whether the items should be replaced, and/or what items would be suitable to replace items that need to be replaced. Trained machine learning models may be trained to perform item recognition based on image, audio, machine data, and/or physiological data received from the sensors. In some embodiments an environment of the user is monitored. The present embodiments may include scraping online information to identify objects that may be suitable for a user and user satisfaction levels of those users. Machine learning, in various embodiments, is used to determine which items to suggest to a user for the user to acquire to fill a need and/or replace an object of the user. A user may be involved in the training of the machine learning model which generates suggestions based on the input of user data and/or item information that is available online. Training the machine learning model by the user and/or with historical information of past user activities, user items, and items available for acquisition may help improve the accuracy of the suggestions generated by the machine learning with respect to finding compatible items and/or items that can restore a satisfaction level of a user.

In at least some embodiments, suggestions for item replacement may be performed via the use of virtual reality displays to help guide item acquisition that is being performed via a user using a virtual reality device. The virtual reality device may have a computer connection to see a virtual world that is created and/or influenced by an item-supplying organization such as a business and/or a store.

In at least some embodiments, the artificial intelligence is implemented to monitor an activity that is being performed by a user, to determine which object or objects are being used by the user and/or are affected by the user performing the activity, to sense a dissatisfaction of the user, and to generate an item suggestion for an item that would help restore an acceptable satisfaction level of the user. The program may in one example receive sensor data, determine that the user is performing picture taking, determine that a camera is involved with the picture taking, determine that the user is dissatisfied with the performance of the camera, identify other cameras available for acquisition which would better please the user, and suggest one or more of those other cameras to the user.

In at least some embodiments, the artificial intelligence is implemented to use sensor data to determine compatibility requirements for an environment and for replacement items to fit into that current environment of a user. The compatibility may include one, more, or all of physical compatibility, electrical compatibility, operability compatibility, etc. The artificial intelligence then uses the compatibility requirements to select other items to suggest as potential replacements that are suitable for the particular environment of the user. Such compatibility analysis performed in an automated manner may enhance object acquisition efforts of a user because the user does not have to search through multiple items which would not suit and/or fit the environment of the user without environmental alterations, e.g., substantial environmental alterations. Thus a user can quickly be presented with compatible options that do not require large environment changes to install the new options. The artificial intelligence is able to suggest specific items such as a refrigerator, an oven, an aerator, a light bulb, a computer game, etc. which fit the environment, e.g., kitchen, computer, plumbing, etc., of the user.

The compatibility comparison may include the generation and comparison of digital specifications representing the objects. The specification may include one or more of item details such as size, e.g., length, width, height, etc., shape, input requirements such as electrical connections, software connections, water line connections, etc. a list of item components, component ingredients, component material constitutions, shapes and sizes of the components, interconnections of sub-components, etc. The digital specification may include line drawings of the object and/or images of the object. The digital specification may include a detailed description or assessment of requirements, dimensions, materials, etc., as for a proposed structure and/or for a computer. For a computer the digital specification may include a detailed description of the hardware installed, such as the memory capacity, processor speed, and graphics card model.

In at least some embodiments, suggestions for new items for a user to obtain may be presented to a user by way of virtual reality in a manner which helps the user appreciate the advantages of the recommended items. Virtual reality may be experienced by a user wearing a display device so that a display screen is present within the visual view path of the user. Other views may be blocked so that an impression is created for the user that the display screen is a new world for the user, e.g., a virtual world. Such a display device may be part of a mask or a headset which is worn by the user on the head. Additionally, the virtual reality device may include an audio speaker which generates sounds related to the images that are displayed. The sounds may further help create an impression for the user that the user in a virtual world that is alternative and/or different to the current physical environment of the user. Additionally, the virtual reality device may include one or more sensors to sense movement and/or feedback provided by the user so that the visual display may be adjusted according to interactions of the user. Thus, if the user moves in a certain direction the visual display may be adjusted so that the user receives new images so that the user has the impression of moving through the virtual world. At least some of the present embodiments include presenting depictions of recommended items so that the user may see images of the new items and select such items for obtaining them. The images of the recommended items in some embodiments may be displayed over and/or near images of the respective item to be replaced so that the user has a better appreciation of how the recommended item is able to successfully replace the current item. The depiction may constitute a digital depiction and/or a digital twin simulation of the actual recommended item.

In at least some embodiments, the presentation of a suggestion for a new item to obtain occurs in a virtual world setting for shopping. In such embodiments, pictures of a shopping facility may be generated on the display device and the user experience is for shopping and obtaining one or more new items in the virtual world. The automated suggestion program of the present embodiments may interact with computer programs of item providers such as businesses and/or stores to obtain images and acquisition information such as prices, transactional information, and/or item delivery/pickup information for displaying for the user in the virtual reality setting. The user may be guided in their virtual reality shopping to obtain items which meet their needs, successfully replace existing products, and/or restore the user satisfaction level.

Figure 5:
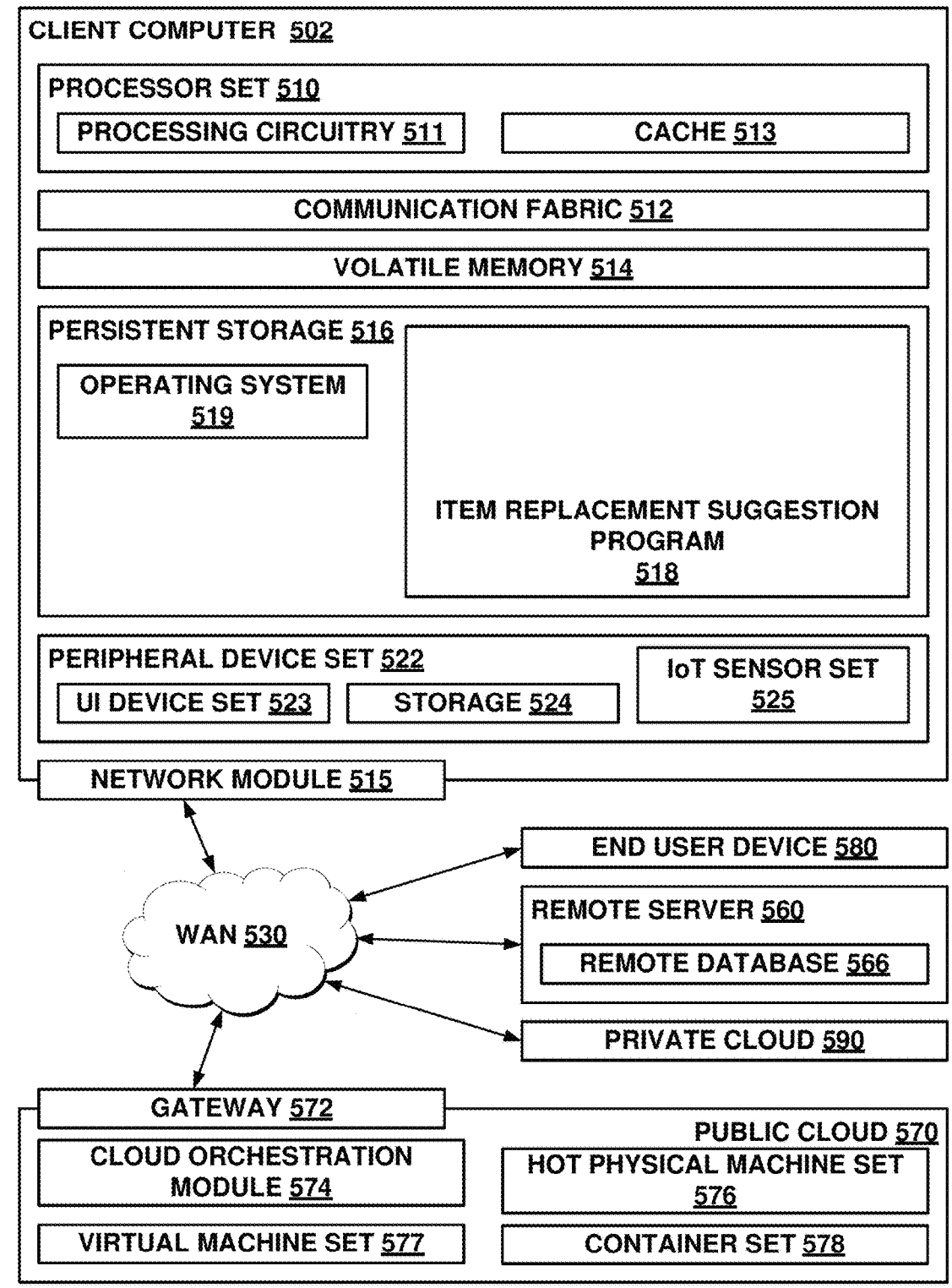
FIG. 5 is a block diagram illustrating a computer environment with multiple computer systems in which the item replacement suggestion generation processes described for FIGS. 3A and 3B may be implemented and which provides examples of details about certain computers and connections of the automated suggestion environment shown in FIGS. 1 and 2 and for the virtual reality environments shown in FIGS. 4A and 4B.

FIG. 1 illustrates an automated suggestion environment 100 for generating, in an automated manner, suggestions for item replacement according to at least one embodiment. The automated suggestion environment 100 in the depicted embodiment includes an automatic suggestion server 102 that hosts an automated suggestion program. The automatic suggestion server 102 is shown as a server in FIG. 1 but may be equivalent and/or equal to the client computer 502 that is shown in FIG. 5 and that includes item replacement suggestion program 518. The automated suggestion environment 100 in the depicted embodiment also includes one or more cameras such as the first camera 104a and the second camera 104b, a smart phone 106 which itself includes a camera, and a pair of smart glasses 108 which hosts a smart glasses computer 110. An automated personal assistant 112 which includes an audio speaker to play audio messages and which includes a microphone to capture sound may also be within the automated suggestion environment 100. The first camera 104a, the second camera 104b, the smart phone 106, the smart glasses computer 110, and the automated personal assistant 112 may each host software to provide for communications with the automated suggestion program of the automated suggestion server 102. In various embodiments, a wired connection may be used in place of wireless connection for one or more of first camera 104a and second camera 104b to the automated suggestion server 102. These first and second cameras 104a, 104b may be arranged to capture images from an environment such as the automated suggestion environment 100. The first and second cameras 104a, 104b may be arranged to capture images of various objects which are used and/or belong to a user and are present in the automated suggestion environment 100. The particular automated suggestion environment 100 shown in FIG. 1 is a kitchen environment. This example kitchen environment includes a range 120, a refrigerator 122, a dishwasher 124, and a sink 126. The cameras may take pictures to determine specification details about the objects such as the range 120, the refrigerator 122, the dishwasher 124, the sink 126, and/or the faucet aerator 128. The specification details may include various factors such as length, width, height, electrical connection, etc. about the items respectively. The cameras may also take pictures to determine factors about how the items respectively fit within the environment-for example the cameras may determine a length within the cabinets or other kitchen structures of the respective space for fitting a range, a refrigerator, a dishwasher, a sink, etc. The automated suggestion environment 100 may be inhabited by a person who registers with the automatic reminder program. Internet-of-Things sensors within the respective mechanical devices and kitchen devices may also communicate with and provide data to the automated suggestion program on the automated suggestion server 102.

The automated personal assistant 112 and/or the cameras may also capture information such as sound and/or images in order to determine when a user desires to replace an item and/or is experiencing dissatisfaction. These sensors may capture information that is evaluated to determine a type of activity that the user is performing. The captured information may be transmitted to the automatic suggestion server 102 and may be input therein to an automatic suggestion program stored on the automatic suggestion server 102. The automatic suggestion program may itself evaluate the data and/or access other software and/or artificial intelligence to evaluate the received data that was captured by the sensors.

Figure 2:
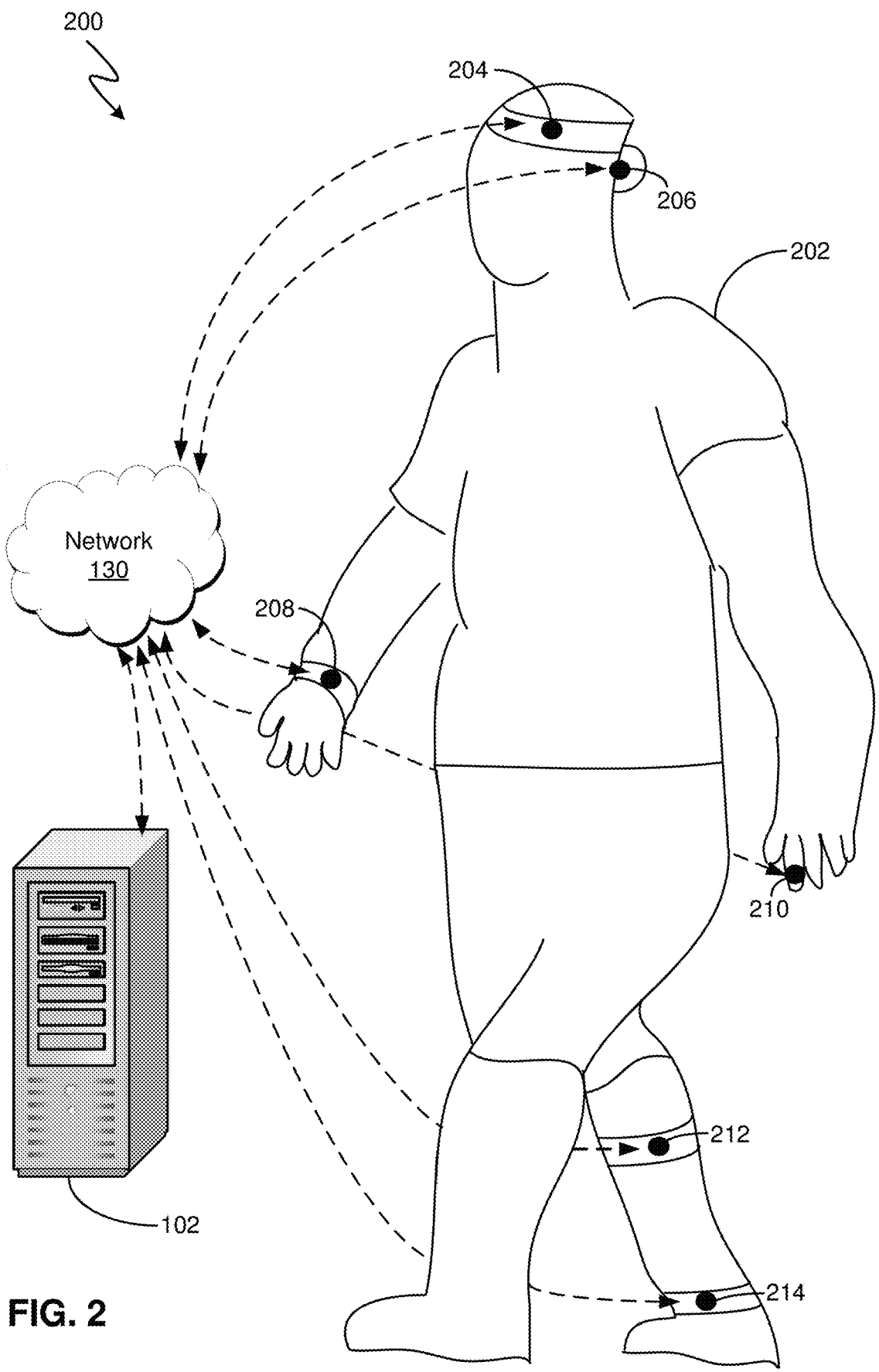
FIG. 2 illustrates a physiological tracking system according to at least one embodiment and which may interact with networked computer environment shown in FIG. 1.

The automated suggestion environment 100 may be used in at least some of the present embodiments in conjunction with a physiological sensor environment 200 as is depicted in FIG. 2. FIG. 2 shows that in this embodiment one or more physiological sensors may track physiological information from a user such as the tracked user 202 who wears the physiological sensors. The physiological sensors may via the network 130 wirelessly transmit captured physiological data to the automatic suggestion server 102 for provision to an automatic suggestion program stored thereon. The physiological sensors may gather physiological information from the tracked user 202 and may gather other information from the vicinity of the tracked user 202. Each of the physiological sensors may be a wearable electronic device and may connect to the network 130 to share data, receive data, and/or receive instructions therethrough.

As is depicted as an example in FIG. 2, first physiological sensor 204 may be part of a headband and may gather physiological information or other information from a head region of the tracked user 202. A second physiological sensor 206 may be part of an earpiece and may gather physiological information or other information from an ear region of the tracked user 202. A third physiological sensor 208 may be part of a wrist device, such as a watch or a fitness strap, and may gather physiological information or other information from a wrist or hand region of the tracked user 202. A fourth physiological sensor 210 may be part of a finger clip and may gather physiological information or other information from a finger region of the tracked user 202. A fifth physiological sensor 212 may be part of a leg band and may gather physiological information or other information from a leg or calf region of the tracked user 202. A sixth physiological sensor 214 may be part of an ankle monitor and may gather physiological information or other information from an ankle or a foot region of the tracked user 202.

The automatic suggestion server 102 may transmit wireless communications with the various computer components via a communication network 130. The automated suggestion environment 100 may include many computers, many cameras, and many servers, although two cameras 104a, 104b, one smart phone 106, one pair of smart glasses 108, and one automated assistant 112 are shown in FIG. 1. Any number of these is contemplated as within the scope of the present embodiments. The network 130 allows communication between the computers, the cameras, the smart phone, the physiological sensors, the smart glasses, the automated assistant, Internet-of-Things sensors and the server. If any of the kitchen structures such as the range 120, the refrigerator 122, the dishwasher 124, and/or the sink 126 are built with Internet-of-things technology, these components may themselves be able to directly communicate with the automated suggestion server 102 via the network 130. The communication network 130 may include various types of communication networks, such as the Internet, a wide area network (WAN), a local area network (LAN), a telecommunication network, a wireless network, a public switched telephone network (PTSN) and/or a satellite network.

The communication network 130 may include connections, such as wire, wireless communication links, or fiber optic cables. The communication network 130 may itself include multiple servers such as a network edge server and an edge/gateway server which may be enabled to run or assist in operation of the automated item suggestion program. The communication network 130 may in some embodiments be or include high speed networks such as 4G and 5G networks. Implementing the present automatic suggestion program in a 5G network will enable at least some embodiments to be implemented on the edge in order to boost network performance. The communication network 130 may in some embodiments be equivalent to the wide area network 530 shown in FIG. 5 and subsequently described in this present disclosure.

As will be discussed with reference to FIG. 5, the automated suggestion server 102 may be a mainframe server (or the equivalent) and may include the components of the client computer 502. Each of the first camera 104a, the second camera 104b, the smart phone 106, the smart glasses 108, and the automated assistant 112 may also include equivalent components of the client computer 502 shown in FIG. 5 including the item replacement suggestion program 518, executing in part or in the entirety on different elements disclosed in connection with FIG. 5. The automated suggestion server 102 may also in some embodiments relationally be equivalent to the remote server 560 shown in FIG. 5. The first camera 104a, the second camera 104b, the smart phone 106, the smart glasses 108, and/or the automated assistant 112 may also in some embodiments relationally be equivalent (or otherwise related) to the end user device 580 shown in FIG. 5. The automated suggestion server 102 may also operate in a cloud computing service model, such as Software as a Service (SaaS), Platform as a Service (PaaS), or Infrastructure as a Service (IaaS). The automated suggestion server 102 may also be located in a cloud computing deployment model, such as a private cloud, community cloud, public cloud, or hybrid cloud. The first camera 104a and the second camera 104b may each be, for example, part of a mobile device, a telephone, a personal digital assistant, a netbook, a laptop computer, a tablet computer, a desktop computer, or any type of computing devices that includes a camera and is capable of running a program, accessing a network, and accessing a database in the automated suggestion server 102 that is located outside of the respective camera. The first camera 104a and the second camera 104b may each include a display screen, a speaker, a microphone, a camera, and a keyboard or other input device for better receiving setting adjustments for the automatic suggestion program and/or camera settings. In some embodiments the first camera 104a and/or the second camera 104b capture and transmit image data to the automatic suggestion server 102 without themselves hosting suggestion-generating software. According to various implementations of the present embodiment, the automatic suggestion program may interact with a database that may be embedded in various storage devices, such as, but not limited to a various computers/mobile devices, the automated suggestion server 102 that may be in a network, or another cloud storage service such as the remote server 560 and/or the private cloud 590 shown in FIG. 5.

Usage of storing content on edge servers may reduce network traffic that is required for data sensing, triggering of the automated suggestion generation, generating a suggestion for item replacement, and/or for presenting a generated suggestion as described herein. This reduction in network traffic may help achieve efficient processing for execution of the methods according to the present embodiments. The users of the automated suggestion program may utilize their network infrastructure to gain appropriate connectivity, e.g. 5G connectivity, into the environment. The present embodiments may take advantage of existing and future 5G infrastructure and its increase of bandwidth, latency, and scaling of applications requiring large amounts of real-time data. The automated suggestion server 102 may trigger data and command flows to be processed by distributed enhanced experience capability programs that are available at a network edge server located at a network edge and/or that are available at an edge/gateway server located at a network gateway. User profile tracking customization and with digital specifications of user items can also flow from the edge gateway/server through the network edge server for access by the automated suggestion server 102 which implements automated generation and presentation of suggestions for item replacement.

The automated suggestion server 102 in at least some embodiments includes one or more machine learning models disposed thereon (or otherwise available) that are accessible to the automated suggestion program. Such machine learning models may be used to perform various aspects associated with the automated suggestion generation such as identifying activities that are being performed by a user, determining one or more objects being used and/or affected via the activity, determining user satisfaction levels, determining that an item should be replaced, identifying one or more items that could successfully replace an item, and/or presenting those items for review by a user, e.g., presenting those items in a virtual reality setting. These aspects may be performed based on the input of a particular type of data that is sensed. Such machine learning models may be trained by the user and/or with historical information of past user activities, items, and/or user satisfaction levels associated with the user or others in order to improve the accuracy of the activities, satisfaction levels, items to replace, and/or items suggested for obtaining. The automated suggestion server 102 may include object recognition and user satisfaction tracking algorithms stored thereon. The automatic suggestion server 102 may include one or more databases that are equivalent to the persistent storage 516 shown in FIG. 5 and may store multiple directories related to the automatic suggestion program. Such directories may include items used by a user, user satisfaction levels with various items, and possible new items that could be obtained for replacing other items. The automatic suggestion server 102 may include a processor which communicates with the automatic suggestion program and a database. Such processor may be equivalent to the processor set 510 shown in FIG. 5 and described subsequently in this disclosure.

A computer system with the automated suggestion program operates as a special purpose computer system in which an automated suggestion process assists in the performance of item acquisition by a user as the program suggests items for the user to obtain. In particular, the automated suggestion program transforms a computer system into a special purpose computer system as compared to currently available general computer systems that do not have the automated suggestion program.

It should be appreciated that FIGS. 1 and 2 provide only illustrations of some environments or implementations and do not imply any limitations with regard to the environments in which different embodiments may be implemented. Many modifications to the depicted environments may be made based on design and implementation requirements.

Figure 3A:
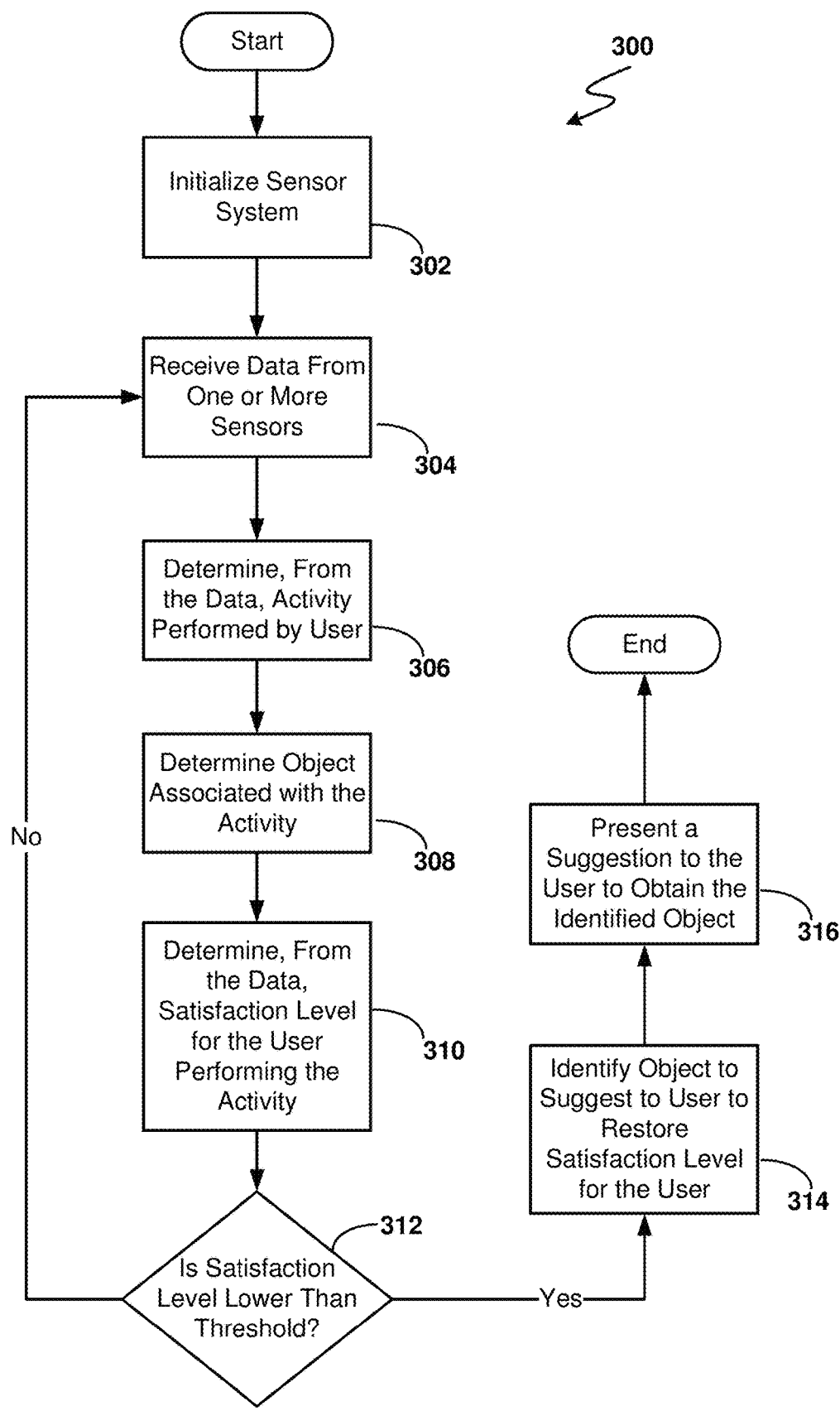
FIG. 3A is an operational flowchart illustrating an item replacement suggestion generation process according to at least one embodiment which analyzes user satisfaction levels of items.

FIG. 3A is an operational flowchart illustrating a satisfaction-level based item suggestion process 300 according to at least one embodiment. This satisfaction-level based item suggestion process 300 may be implemented using one or more portions of an automated suggestion program that is on the automated suggestion server 102 shown in FIGS. 1 and 2. The automated suggestion program may include and/or access various modules, user interfaces, services, machine learning models, personal information management software, and natural language processing tools and may use data storage when performing the satisfaction-level based item suggestion process 300. The satisfaction-level based item suggestion process 300 helps prepare the automated system for identifying items that should be replaced and/or upgraded as was depicted in FIGS. 1 and 2 above and for helping the user identify and obtain items that are suitable as a replacement/upgrade.

In a step 302 of the satisfaction-level based item suggestion process 300, the sensor system is initialized for use with the automated suggestion program. In at least some embodiments, this initialization occurs with respect to a specific account for a user who has registered to use the automated suggestion program. The sensors to be registered with the account may belong to the user and/or to another person or entity who has shared the sensors with the user. The sensors may be installed at a usual place of habitation of the user, e.g., at a home, a vehicle, an office, a warehouse, and/or other facility of the user. An additional computer may be registered to the account by the user with the automated suggestion program. Such additional computer may be any computer which may hold data such as image data, audio data, device data, and/or physiological data captured by the one or more sensors and may register with the automated suggestion program to download an instance of the automated suggestion program. For example, the smart phone 106 shown in FIG. 1 may register with the system, may download an instance of the automated suggestion program (or other communication program for communicating with the automated suggestion program), may capture, with its smart phone camera and/or its smart phone microphone, images and/or sounds, and may upload those images and/or sounds to a program database. Users may choose to register with the automated suggestion program who want to receive suggestions for item replacement. In order to perform the registration, the user may actuate various graphical user interface buttons of a website and/or an app that are displayed on a display screen of the respective computer when the downloaded app is stored and executed. The display may include one or more scrollable lists or swipable graphics that are displayed on the display monitor of a local computer such as the smart phone 106 which the user may use for registration. The downloaded application may also be synched up with the one or more sensors such as the first and second cameras 104*a*, 104*b* of the environment.

As part of the registration, in various embodiments consent is requested and obtained by the automated suggestion program from the user to permit the automated suggestion program to monitor an environment of the user, to access software associated with the user such as virtual reality shopping software and/or personal information management software, and/or to generate digital specifications of items that belong to the user. The automated suggestion program may generate a graphical user interface to request and receive this consent from the user. The user may actuate a computer such as the smart phone 106 to engage the graphical user interface and provide this consent.

The initialization of step 302 in at least some embodiments includes the input of cameras, camera positions in the surroundings/environment at the observed area, and computers, e.g. the smart phone, smart glasses, automated assistant, physiological sensors, and/or local server/computer. Using these input variables, the automatic suggestion program may generate a selection array for the registering user which is presented by way of a generated graphical user interface to allow the user to decide which sensors may capture data for satisfaction-level tracking and for item evaluation and which times/days the sensors should be enabled or disabled for tracking.

The initialization of step 302 in at least some embodiments includes the pairing of the computers and sensors with the automatic suggestion server 102. The automatic suggestion server 102 may in this embodiment with pairing be in the environment in which the sensors are operating. For example, the smart phone 106, the smart glasses 108, the first, second, third, fourth, fifth, and/or sixth physiological sensors 204, 206, 208, 210, 212, 214 need to be turned on and connected to an internet connection such as a home private cloud. A scan function may be activated on the automated suggestion server 102 to search for local connectable devices. An entry for the various sensors may be selected and an activation code and/or respective activation codes for the various sensors may be generated. The user may then enter in this activation code at the sensor as part of the pairing and/or registration. Due to the pairing, the paired sensor may automatically transmit data to the automatic suggestion server 102.

The system initialization of step 302 in at least some embodiments includes the user providing via text, e.g., via typing or speaking and using a text-to-speech transcription program, a list of one or more items which the user owns and/or would like to be potentially checked for replacement possibilities. The automated suggestion program in subsequent steps of the satisfaction-level based item suggestion process 300 may compare the output of the artificial intelligence/machine learning models with such a list of items for confirmation and/or refinement of the artificial intelligence. In some instances, the automated suggestion program may generate and present a predetermined list of common items to monitor for replacement. The user during this registration may navigate through the list and confirm item-by-item whether the user has the item which should be monitored for a potential replacement.

The user may in some embodiments provide to the automated suggestion program a location of the item for helping the automated suggestion program know which sensor information, e.g., from certain of the one or more sensors, to associate with a particular item. The user may capture and upload one or more pictures of these items that are transmitted to the automated suggestion program. This uploading of pictures may help skip or reduce the learning curve that a machine learning model may need to identify various items in the surrounding/environment. The user may provide a caption for each picture so that the automated suggestion program may know the name of the item(s) from that picture and to be monitored. A computer registered with the automated suggestion program, accessing a website of the automated suggestion program, and/or paired with the automated suggestion server 102 may provide such images to the automated suggestion program. With this information, the automated suggestion program may better decipher from the image data provided by the cameras 104a, 104b, smart phone 106, smart glasses 108, etc. images in which a respective item is present. Using this recognition, the automated suggestion program may recognize and store a particular location for the item within the environment. The user images may be stored in data reserved for a user account with the automated suggestion program. In some embodiments, the user may also for the account provide a typical activity that the user performs with the item.

In some embodiments, these images with their captions may be used for supervised training of a machine learning model which receives sensor data such as image data of the surveilled environment and outputs one or more activities that are currently being performed by a user. As part of the training, the machine learning model learns to recognize items involved with an activity in addition to recognizing activities performed by a user.

In a step 304 of the satisfaction-level based item suggestion process 300, data is received from one or more of the sensors. The one or more sensors are part of the sensor system that was initialized in step 302. The various sensors such as the first camera 104a, the second camera 104b, the smart phone 106, the smart glasses 108, the automated assistant 112, the first physiological sensor 204, the second physiological sensor 206, the third physiological sensor 208, the fourth physiological sensor 210, the fifth physiological sensor 212, and/or the sixth physiological sensor 214 capture data and may transmit the captured data via the network 130 to the automated suggestion server 102. The sensors may capture data at times and/or days of a pre-determined schedule determined by the user during system initialization of step 302. The captured data may for example, include image data, audio data, device data, and/or physiological data. The captured data may be transmitted to the automated suggestion server 102 in a continuous manner upon the data capturing and/or in an intermittent manner in multiple batches of data.

In a step 306 of the satisfaction-level based item suggestion process 300, from the data an activity performed by the user is recognized. The data that is analyzed for step 306 refers to the data that was received in step 304. The automated suggestion program may input the received sensor data into a machine learning model trained to recognize that an activity is being performed. The machine learning model may recognize images, noises, device data (e.g., temperature and/or electric flow information of a stove) and/or spoken words that are associated with particular activities. The automated suggestion program may receive audio files that include captured spoken words. The program may perform speech-to-text transcription to the audio files. The automated suggestion program may perform natural language processing to the thereby-transcribed text to generate text of words that have been spoken in an environment that is being monitored such as the automated reminder environment 100 and the bio-metric environment 200. The machine learning model may learn to associate certain words being spoken with certain activities that are taking place. The machine learning model may associate certain sensed data with activities such as cooking, cooking with a particular instrument such as an oven, stovetop, microwave, etc., exercise, cleaning such as vacuuming, mopping, window washing, sweeping, dish washing, etc., exercising, music consumption, media consumption, etc. The machine learning model may output one or more determined activities in response to receiving the sensor data and/or modified sensor data as input. The machine learning model output of the one or more determined activities represents the artificial intelligence-interpretation of an activity being performed.

In some embodiments, the determination of step 306 may be made based on a manual entry by the user. For example, the user could type into the keyboard of the smart phone 106 and/or speak into the microphone of the personal assistant 112 to indicate that the user is undertaking a particular activity. In these instances, the automated suggestion program may determine the activity being performed without needing to submit the sensor data into a machine learning model for determining the activity.

In a step 308 of the satisfaction-level based item suggestion process 300, an object associated with the activity is determined. This activity is the activity that was recognized in step 306. The machine learning model that determines the activity and/or another machine learning model may be trained to perform object recognition in response to receiving images as input. The machine learning model may recognize images, noises, device data, and/or spoken words that are associated with particular items. Text from spoken words that are recorded and produced via speech-to-text transcription may include a respective name of one or more items being used. activities. For example, the user may be using a vacuum cleaner to perform cleaning of the house, may be using an automatic dishwasher to wash dishes, may be using a stove to cook food, may be using a yoga mat to perform exercise, may be using a tool such as a wrench to perform a plumbing task, etc.

The machine learning model may output one or more determined items in response to receiving the sensor data and/or receiving the machine learning model output of the identified activity. The identified activity that is output of one machine learning model may be used as input for another machine learning model or to another layer of the same machine learning model to generate additional output of an object associated with an activity being performed. The machine learning model output of the one or more items being used represents the artificial intelligence-interpretation that is provided for step 308.

In some embodiments, the determination of step 308 may be made based on a manual entry by the user. For example, the user could type into the keyboard of the smart phone 106 and/or speak into the microphone of the personal assistant 112 to indicate that the user is using a particular item and/or referring to a particular item. In these instances, the automated suggestion program may determine the item to be analyzed without needing to submit the sensor data and/or the current activity into a machine learning model for determining the item.

In a step 310 of the satisfaction-level based item suggestion process 300, a satisfaction level for the user performing the activity is recognized from the data. The activity referred to is the activity that was recognized via step 306 by using the data received in step 304. The sensor data such as image data, audio data, device data, and/or physiological data may be input into another machine learning model which as output provides a satisfaction level of a user. The machine learning model may be trained to contextually analyze the data and the user behavior and associate certain physiological signals with a high or a low satisfaction level. The machine learning model may be trained to perform analysis of facial expressions to determine user satisfaction level, such as associating smiles with a high satisfaction level and frowns with a low satisfaction level. To determine user satisfaction level the machine learning model may be trained to perform analysis of audio sounds and/or words generated, such as associating praise, shouts of excitement, etc. with a high satisfaction level and anger-based shrieks or curse words with a low satisfaction level. The machine learning model may in step 310 provide as output a satisfaction level that may be a numerical value. The machine learning model may be trained to associate different images, sounds, device signals, and/or physiological signals with different numerical levels of a satisfaction range. The satisfaction level that is determined may be for the object used in an activity in addition to or in alternative to the satisfaction level for the activity. The machine learning model may use factors such as an excessive time taken to perform a task and/or a quality of an object has dropped to determine that the user has a low satisfaction level for an object.

In a step 312 of the satisfaction-level based item suggestion process 300, a determination is made as to whether the satisfaction level is lower than a threshold. The satisfaction level refers to the satisfaction level that was determined in step 310. The threshold may be a pre-determined threshold. If the determination of step 312 is affirmative and the user satisfaction level is below the threshold level, the process 300 proceeds to step 314. If the determination of step 312 is negative and the user satisfaction level is above the threshold level, no item suggestion is needed and the process 300 returns to step 304 for a repeat of steps 304, 306, 308, 310, and/or 312. Thus, these steps of the satisfaction-level based item suggestion process 300 may constitute a loop which is exited once a user satisfaction level is below a particular threshold level which is interpreted as indicating that it is appropriate to provide the user a suggestion for replacing an item. The determination of step 312 may be performed via a comparator of the automated suggestion program which performs a numerical comparison of the user satisfaction level with the threshold. The user may pre-determine the threshold level. The user may receive what the user considers too many or not enough suggestions from the automated suggestion program and, in response, lower or raise, respectively, the threshold level. The user may adjust the threshold level by interacting with a graphical user interface generated by the automated suggestion program. The user may additionally and/or alternatively provide audio commands to the automated suggestion program via a microphone of the smart phone 106 and/or the automated personal assistant 112 to adjust the threshold level. In some embodiments, the automated suggestion program may use training from other trained machine learning models (trained with the experiences of other users) to determine a threshold level. In one example, a satisfaction level is generated on a scale of 0 to 100 with 0 being a lowest satisfaction and 100 being a highest satisfaction. The threshold level in one embodiment may be 45 on the range of 0 to 100 and that threshold level may be adjusted by the user.

In a step 314 of the satisfaction-level based item suggestion process 300, an object to suggest to the user to restore the satisfaction level for the user is identified. This object may be determined via inputting one or more of the determined activity, the determined one or more objects, and the determined satisfaction level into a machine learning model which in response outputs a suggested object. The machine learning model may be trained in a supervised manner with various sets of such information including a suggested object that might help restore a satisfaction level for the user. The automated suggestion program may perform online scraping to identify objects and satisfaction levels associated with those objects. The automated suggestion program may analyze user feedback that is retrievable online about a particular object and generate an object satisfaction level based on the online-available user feedback. A star ranking for an object based on ratings of users who used the object may be retrieved in an automated manner, i.e., scraped, via the automated suggestion program from a website. The automated suggestion program may correlate a star ranking, e.g., five stars being the highest ranking, to a numerical user satisfaction level that can be compared with the user satisfaction level that was determined in step 310 and involved in the comparison of step 312. The automated suggestion program may retrieve and analyze object metadata and feature metadata that are retrievable from an online data source such as a website. The retrieved metadata information may be saved in an information database associated with and/or accessible by the automated suggestion program. The automated suggestion program may perform natural language processing on text that is scraped from websites. The automated suggestion program may hold lists of objects associated with activities and possible escalatory choices of new items to suggest if other objects have not satisfied the user.

In some embodiments, the automated suggestion program may identify another object of the same type as the object currently owned/used by the user. For example, if the user is using a refrigerator and has a dissatisfaction level about the refrigerator, the automated suggestion program as part of step 314 may identify another refrigerator that is newer, has higher performance levels (as indicated by online available material), and/or has additional features/design elements to suggest to the user. The newer model refrigerator that is suggested is still a refrigerator. In another example, in response to a user being dissatisfied with their current dishwasher machine, the automated suggestion program may suggest another dishwasher model which includes a third rack for holding utensils. The new suggestion is a dishwasher machine as well. In another example, in response to a user being dissatisfied with a conventional swing door with hinges, the automated suggestion program may suggest a sliding door that slides along rails.

In some embodiments, the automated suggestion program may identify an object of a different type than the object currently owned/used by the user. For example, if for cleaning kitchen air that has cooking odors, smoke, and moisture the user is using an air filter that is disposed on an underneath side of a microwave and that recirculates air above a stove top, and if the user has indicated dissatisfaction with that filter system, the automated suggestion program may suggest replacing that system with a hood vent which sucks up cooking air and emits the air to an external area outside of the kitchen, e.g., to an area outside of the building. The hood vent is a different type of object then the recirculating air filter.

In some embodiments, the automated suggestion program may determine that the user is performing an activity related to plumbing and is struggling to finish, i.e., is experiencing a satisfaction level below the threshold. The automated suggestion program may determine this activity of plumbing by analyzing the sensor data such as images. The images may indicate that the user is positioned near a location generally associated with water running such as at and/or under a sink. In one embodiment the automated suggestion program determines that the user is having problems with a water faucet aerator. The automated suggestion program may recommend a particular aerator that fits the size requirement of the current water faucet and that can replace the previous aerator.

In some embodiments, the automated suggestion program may determine that the user is performing a photography activity and has expressed dissatisfaction with an aspect of the photography with respect to the camera being used. The automated suggestion program may find an available camera which has improved features and/or capabilities compared to the camera currently used. The automated suggestion program may suggest the other available camera to restore the satisfaction levels of the user.

Figure 4A:
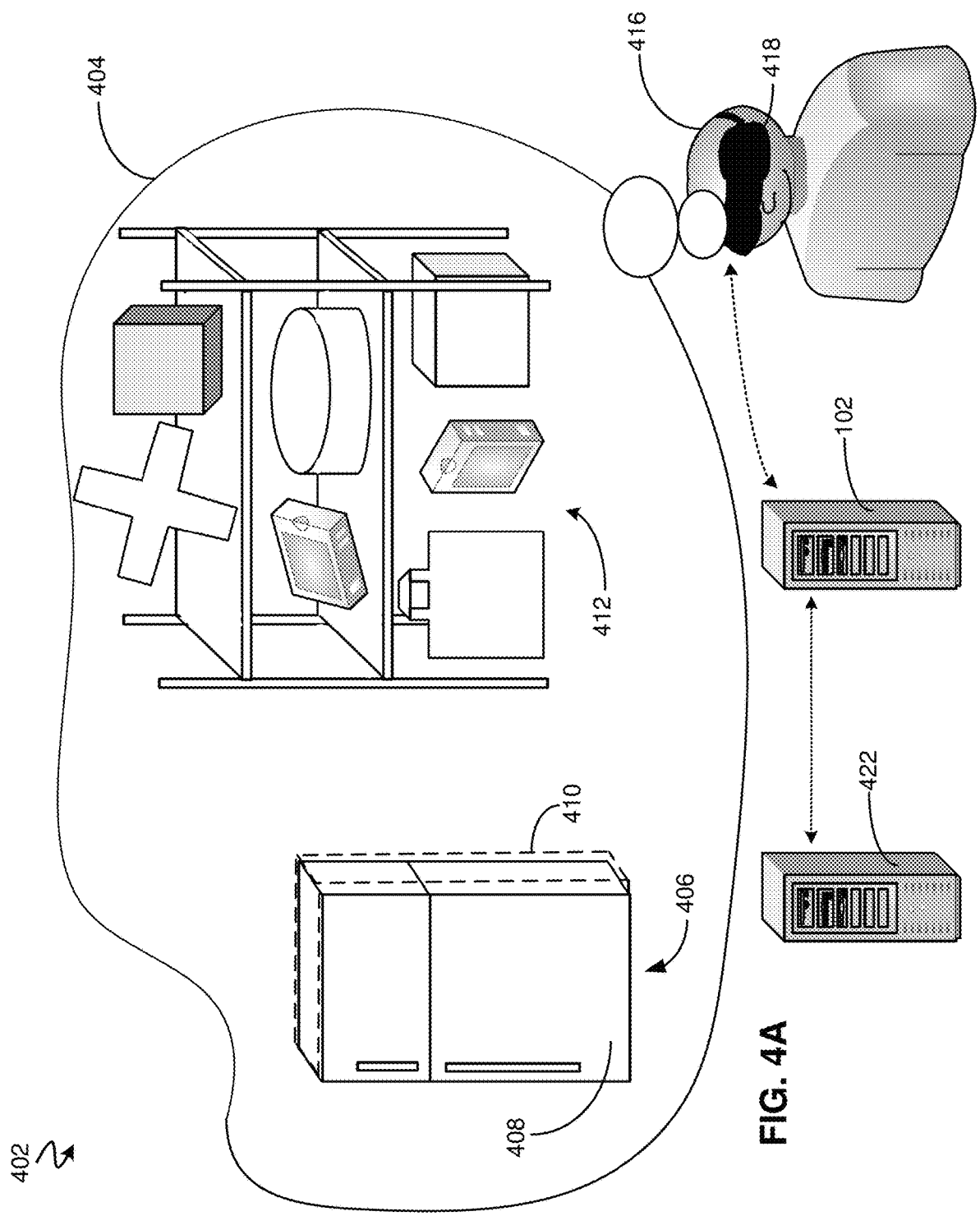
FIG. 4A illustrates virtual reality display of replacement item suggestions according to at least one embodiment.

In a step 316 of the satisfaction-level based item suggestion process 300, a suggestion to the user to obtain the identified object is presented. The identified object refers to the object that was identified in step 314. This presentation in at least some embodiments may occur in a virtual reality environment so that a visual depiction of the suggested object is shown to the user. The suggestion and/or the presentation of the suggestion may constitute a recommendation to the user. The recommendation indicates an ability of the identified object to replace the object for which replacement has been deemed desirable. FIGS. 4A and 4B which will be described subsequently show examples of presenting in a virtual reality environment one or more objects to a user as a recommendation/suggestion. In other embodiments, other forms of suggestion presentation may occur. For example, the automated suggestion program may generate, as part of the suggestion, text that includes a web link to a website via which the object may be viewed and/or may be requested. In some embodiments, in response to receiving the recommendation the user may perform a requesting of the item. The requesting may include a commercial transaction as the user agrees to pay money for the item in exchange for having the item be shipped to the user and/or for having the item be made retrievable by the user. The text may be transmitted to a computer associated with the user, e.g., to the smart phone 106 for display on a display screen of the smart phone. In some embodiments, the presentation may occur via generation of audio that speaks the suggested object. An audio file with this suggestion could be transmitted to a computer associated with the user, e.g., to the smart phone 106, to be played by an audio speaker of the smart phone 106. In some embodiments where the automated suggestion server 102 itself is a computer that includes a display screen, an input/output device such as a keyboard, and/or an audio speaker the presentation of the suggestion may occur at the automated suggestion server 102 itself.

Figure 3B:
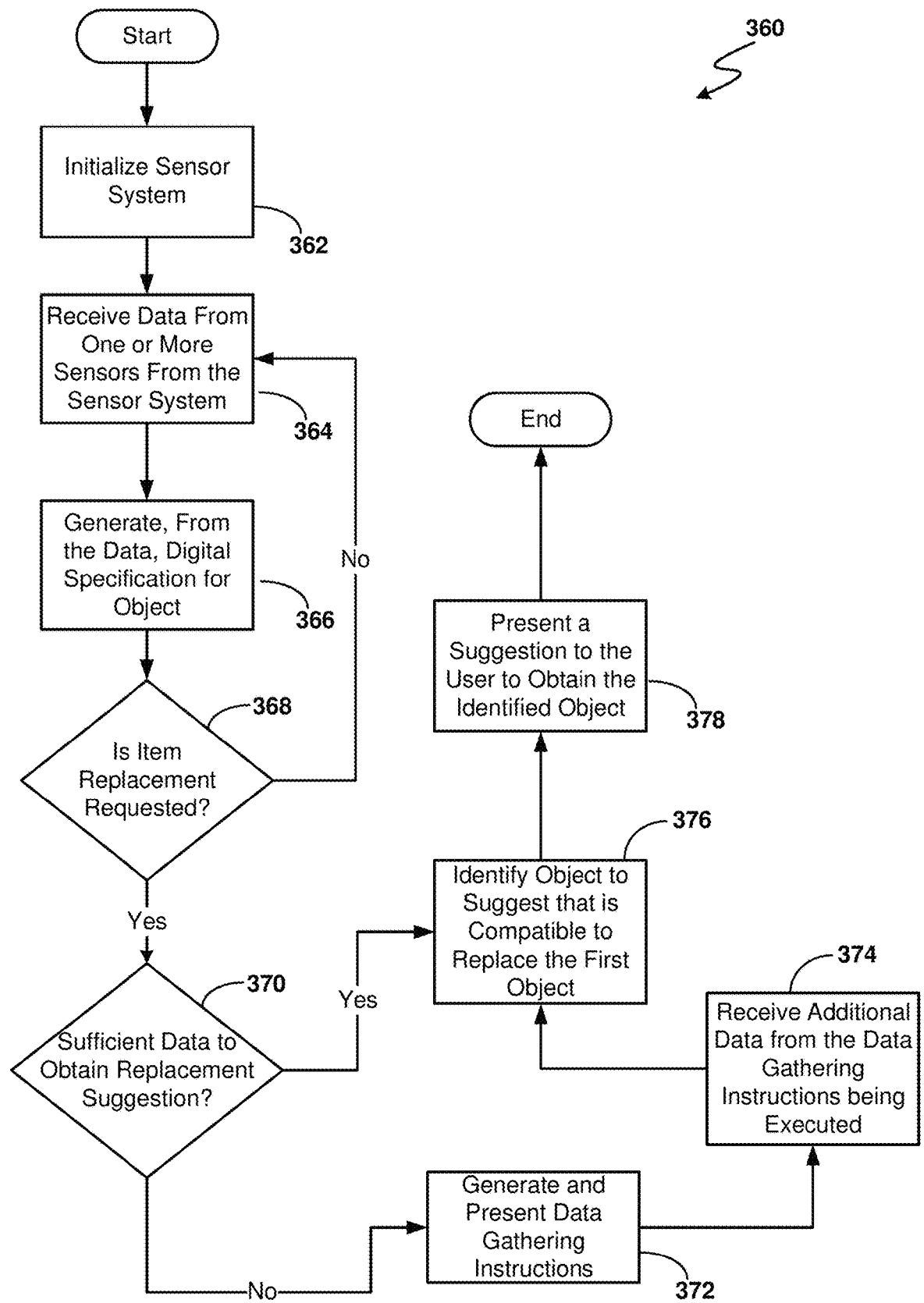
FIG. 3B is an operational flowchart illustrating an item replacement suggestion generation process according to at least one embodiment which analyzes compatibility of the replacement item with respect to the applicable environment.

FIG. 3B is an operational flowchart illustrating a compatibility-based item suggestion process 360 according to at least one embodiment. This compatibility-based item suggestion process 360 may be implemented using one or more portions of an automated suggestion program that is on the automated suggestion server 102 shown in FIGS. 1 and 2. The automated suggestion program may include and/or access various modules, user interfaces, services, machine learning models, personal information management software, and natural language processing tools and may use data storage when performing compatibility-based item suggestion process 360. The compatibility-based item suggestion process 360 helps prepare the automated system for identifying items that should be replaced or upgraded as was depicted in FIGS. 1 and 2 above and for helping the user identify and obtain items that are suitable as a replacement/upgrade. The compatibility-based item suggestion process 360 described below and shown in FIG. 3B may be performed in conjunction with or as an alternative to the satisfaction-level based item suggestion process 300 that was described above and is shown in FIG. 3A.

In a step 362 of the compatibility-based item suggestion process 360, the sensor system is initialized for use with the automated suggestion program. This initialization of step 362 corresponds to the initialization of step 302 that was described previously for the satisfaction-level based item suggestion process 300 shown in FIG. 3A. Thus, the explanation provided above for step 302 also applies for step 362.

In a step 364 of the compatibility-based item suggestion process 360, data is received from one or more of the sensors. This data reception of step 364 corresponds to the data reception of step 304 that was described previously for the satisfaction-level based item suggestion process 300 shown in FIG. 3A. Thus, the explanation provided above for step 304 also applies for step 364.

In a step 366 of the compatibility-based item suggestion process 360, a digital specification for an object is generated from the data. This data refers to the data that was received in step 364. The digital specification may include one or more of a size, a shape, input requirements such as electrical connections, software connections, water line connections, a list of item components, component ingredients, sub-component material constitutions, shapes and sizes of the sub-components, interconnections of sub-components, etc. To generate the digital specification, the automated suggestion program may utilize image data, sound data, device data, physiological data, etc. that is/are received from one or more sensors in step 364. In some embodiments, step 366 may include performing web scraping and natural language processing to identify and obtain design plans for particular objects. For example, an image received in step 364 may indicate a model name and number for an item and the automated suggestion program may in step 366 perform an automated web search with the model name and/or number in order to learn object design features, sizes, etc. The generation of the digital specification in step 366 may include the automated suggestion program performing some natural language processing on text data received from web scraping. In some embodiments, optical character recognition may be performed on images retrieved from web scraping in order to generate text which can better be evaluated via natural language processing. The automated suggestion program may search the web for articles and/or videos which describe structural and performance details about objects. The automated suggestion program may analyze text, images, and/or audio (e.g. by performing speech-to-text transcription of such audio) from such online sources in order to generate the digital specification for a respective object. The automated suggestion program may compare component details that were retrieved from web scraping with sensor data received directly from the sensors of the sensor system of the particular user to confirm matching of the information. If a match is not confirmed, then the automated suggestion program may discard or sideline the online-retrieved information while additional data is sought from the sensors and/or from additional web scraping. A respective digital specification may be generated by the automated suggestion program for multiple objects within the area of the user and in which the sensors are present. The automated suggestion program may determine a nature of items held in individual containers. The digital specification may include an expiration date of particular items. Digital specifications including digital twin models may be generated for multiple mechanical devices and/or electronic devices within the vicinity of the sensors. The automated suggestion program may as part of the digital specification determine a time of creation of the object and a predicted time of malfunctioning. The digital specification that is generated for an object may be stored in memory that is part of the automated suggestion program or that is accessible to the automated suggestion program.

The generation of step 366 may include the automated suggestion program inputting the received sensor data into a machine learning model trained to generate digital specifications for objects. The machine learning model may recognize images, noises, device data (e.g., electrical flow patterns), and/or spoken words that are associated with particular objects. The user may also have direct involvement in step 366 by providing a name and/or a title of a particular object. The automated suggestion program may generate a graphical user interface to ask if particular sensor data such as images were generated from a particular predicted object. The user at this point via the graphical user interface may confirm or reject whether an object predicted by the machine learning model is an object of the user. In some instances, the machine learning model may request an object name associated with certain potential object data in order to further pursue digital specification generation for the object. The automated suggestion program may use the name for further web search and/or further internal memory search to seek and retrieve other information pertaining to the object type. The machine learning model may output a digital specification in response to receiving the sensor data and/or modified sensor data as input. The machine learning model output that is the digital specification represents an artificial intelligence-interpretation of the data for step 366.

In a step 368 of the compatibility-based item suggestion process 360, a determination is made whether an item replacement is requested. If the determination of step 368 is affirmative and item replacement has been requested, the compatibility-based item suggestion process 360 proceeds to step 370. If the determination of step 368 is negative and no item replacement has been requested, the process may loop back to step 364 for a repeat of steps 364 and 366 for the generation of additional digital specifications of objects/items of the user that are able to be sensed via the sensor system and/or for further refinement of already-generated digital specifications of object/items based on new sensor data. Thus, the steps 364, 366, and 368 may together constitute a loop that is repeated until a request for item replacement is recognized and the compatibility-based item suggestion process 360 exits that loop by proceeding to step 370.

The determination of step 368 may be performed using a machine learning model which receives sensor data as input and as output gives a determination as to whether item replacement is requested. The sensor data such as image data, audio data, device data, and/or physiological data may be input into a machine learning model which as output provides the determination of a replacement request. The machine learning model may be trained to associate certain physiological signals with a desire for item replacement. For example, physiological measurements within a standard range may indicate calmness for a user and no desire for item replacement. Biometric measurements that indicate an agitated state for a user may be indicative of a desire for item replacement. The machine learning model may be trained to perform analysis of facial expressions to determine whether item replacement is requested. The machine learning model may be trained to perform analysis of audio sounds and/or words generated to determine user satisfaction level, such as associating praise, shouts of excitement, etc. with no need for item replacement and anger-based shrieks or curse words with requests for item replacement. The machine learning model may in step 368 provide as output an affirmation that item replacement is requested and a name of the object for which replacement is requested.

In some embodiments, the determination of step 368 may be made based on a manual and/or direct request by the user. For example, the user could type into the keyboard of the smart phone 106 and/or speak into the microphone of the personal assistant 112 to indicate that the user requests replacement and/or an upgrade for a particular object. In some embodiments, the automated suggestion program may then use this entry to know the item to replace without needing to submit other sensor data into a machine learning model for determining that a replacement request has been made. In some embodiments, the automated suggestion program may provide a graphical user interface for entering an object to replace and a GUI button or icon to submit the replacement request.

In a step 370 of the compatibility-based item suggestion process 360, a determination is made whether the automated suggestion program already has sufficient data to obtain a replacement suggestion. If the determination of step 370 is affirmative and the program has sufficient data, the compatibility-based item suggestion process 360 skips steps 372 and 374 and proceeds directly to step 376. If the determination of step 370 is negative and the program has insufficient data to obtain replacement suggestion, the compatibility-based item suggestion process 360 proceeds to steps 372 and 374. Step 370 may in some instances be referred to as a determination of whether a digital specification for the object that is to be replaced includes sufficient detail and has sufficient information about connections with other items in the environment in order for the automated suggestion program to determine compatibility of potential replacement items within that environment. In some instances, the step 370 may be performed via submitting a full or partial state of the digital specification for the item to be replaced to a machine learning model associated with step 376 for identifying the replacement object. The machine learning model may provide as output that more information is needed and that a compatible replacement is not able to be determined with the current information.

In a step 372 of the compatibility-based item suggestion process 360, data gathering instructions are generated and presented. These data gathering instructions constitute instructions for gaining additional information that the automated suggestion program will need in order to use the digital specification to identify replacement objects that would be compatible with the current environment of that object.

For example, the automated suggestion program may recognize that additional images of the item to replace and/or of the environment, e.g., the immediate environment, of that item, are needed. For example, if the item to replace is a dishwasher and the automated suggestion program does not have sufficient data about the size of the dishwasher the automated suggestion program may suggest to the user to obtain more data about the object size. This suggestion may give help tips for obtaining the additional data. Such tips may include taking a picture of the object with an object of a known length in the same frame within an image. The tips may also include using a tape measure to measure certain physical aspects of the object and enter the data to the computer for the program. In another example, if the item to replace is a dishwasher and the automated suggestion program does not have sufficient information about the available space within the kitchen for placing a new dishwasher the automated suggestion program may suggest to the user to obtain more data about the kitchen environment, e.g., by capturing data (e.g., via images and/or manual measurements) the size of the opening within the kitchen walls and/or cabinets for placing a new dishwasher.

The data gathering instructions may be in the form of text and/or audio data that are presented to the user. The text may be transmitted to a computer associated with the user, e.g., to the smart phone 106 for display on a display screen of the smart phone. In some embodiments, the data gathering instructions may be presented via generation of audio that speaks the suggested object. An audio file with the data gathering instructions could be transmitted to a computer associated with the user, e.g., to the smart phone 106, to be played by an audio speaker of the smart phone 106. In some embodiments where the automated suggestion server 102 itself is a computer that includes a display screen, an input/output device such as a keyboard, and/or an audio speaker the presentation of the data gathering instructions may occur at the automated suggestion server 102 itself.

In at least some embodiments, the data gathering instructions are transmitted to a user computer for augmented reality display of the instructions in order to help the user perform the data gathering instructions. For example, the automated suggestion program may provide augmented reality directions to the smart glasses 108 that are displayed in the view of a person wearing the smart glasses 108 to guide the user to obtain the additional data. Thus, when a user wears the smart glasses 108 the user can see a portion of a view of the actual environment such as the kitchen environment shown in FIG. 1 and also in the view of the smart glasses 108 can see the data gathering instructions overlaid over a portion of the regular view of the environment. These augmented reality instructions may include words and/or arrows which guide the user to a particular location to obtain the data. The location information may represent the actual location of the item to be replaced. The location information may include a name and/or physical coordinates of the location. For an environment that is regularly frequented and/or inhabited by the user, the automated suggestion program may host and/or generate a virtual three-dimensional map of the environment so as to implement physical landmarks (e.g. walls of a house) and to guide the user to a particular location within that environment, e.g., using three-dimensional coordinates with the map as a reference. The location information in various embodiments includes arrow information that is usable by the automated suggestion program to generate an arrow that is superimposed over a field of view of an area on a display screen and that points the user viewing the augmented reality display to the location of the item or surroundings from which additional data needs to be gathered.

The data gathering instructions may be presented as augmented reality in other devices besides the smart glasses 108. The data gathering instructions may be implemented with other computers that have display screens, e.g. with other computers that are capable of implementing augmented reality over a camera view displayed on a display screen.

For example, the augmented reality instructions may instruct a user to take a picture of the cabinets surrounding the dishwasher. The instructions may instruct a user to take such a picture with a size reference object within the frame. The automated suggestion program may use the size reference object and compare the size of the surrounding objects with respect to the size reference object to determine other dimensions such as an opening within the cabinets for receiving a new dishwasher.

In a step 374 of the compatibility-based item suggestion process 360, additional data is received from the execution of the data gathering instructions. The automated suggestion program at the automated suggestion server 102 may receive in a data transmission additional data from a sensor such as the smart phone 106 that was gathered in response to a person executing the data gathering instructions. Such data transmission may occur via the communication network 130.

In a step 376 of the compatibility-based item suggestion process 360, an object to suggest that is compatible to replace the first object is identified. The first object refers to the item whose replacement was requested in step 368. This replacement object may be determined via inputting one or more of the object digital specification and a digital specification of the surroundings into a machine learning model which, in response, outputs a suggested object. The machine learning model may be trained in a supervised manner with various sets of information including object digital specifications and specifications of the user environment and labeled potential replacements that are compatible in the user environment for fitting the relevant object digital specification. The automated suggestion program may perform online scraping to identify objects and their specifications for comparison with the digital specification of the item that is to be replaced and with the environment of the user. The automated suggestion program may perform natural language processing on text that is scraped from websites. The automated suggestion program may perform web scraping to retrieve size information and connection information for various products and cause the retrieved information to generate a digital specification to compare with the first object digital specification. The automated suggestion program may retrieve and analyze object metadata and feature metadata that are retrievable from an online data source such as a website. The retrieved metadata information may be incorporated into the digital specification(s) that are generated.

For example, in the kitchen shown in the automated suggestion environment 100 depicted in FIG. 1 the automated suggestion program may determine that the user requests suggestions for replacing the dishwasher 124. The automated suggestion program may determine an available width 125 based on the sensor data received and which indicates a distance between the surrounding cabinets into which a new dishwasher must fit without having to move and/or modify the adjacent cabinets. Thus, the automated suggestion program will search for another dishwasher to suggest which has a width that does not exceed the available width 125 within the cabinet spaces in the kitchen. For suggested dishwashers, the automated suggestion program may choose one or more other dishwashers with a respective width that is equal than or smaller than the available width 125. The automated suggestion program may also determine a height of any adjacent surfaces for the surrounding structure and choose a suggested dishwasher with a height that will maintain an optimal transition surface between the new dishwasher and the surroundings, e.g., would maintain a flush transition.

For another example, in the kitchen shown in the automated suggestion environment 100 depicted in FIG. 1 the automated suggestion program may determine that the user requests suggestions for replacing the refrigerator 122. Besides size checking, the automated suggestion program may know from historically saved information about refrigerators to check for other factors such as available water connection at that location in the kitchen. If a water line already runs directly to the refrigerator, then the automated suggestion program may allow new refrigerators to be suggested with a water dispenser built into the refrigerator. If a water line does not run directly to the refrigerator, then the automated suggestion program may de-prioritize any new refrigerator with a water dispenser built into the refrigerator. In some instances, the sensor data may indicate whether a water line runs to the refrigerator. For example, if the automated suggestion program receives and recognizes images and/or sounds of a user filling a cup with water from a built-in water dispenser of the refrigerator 122 then the automated suggestion program determines that the water line is present. If the automated suggestion program has no images of a current refrigerator including a built-in water dispenser, the automated suggestion program may cause the compatibility-based suggestion process 360 to proceed through steps 372 and 374 for obtaining more data about whether a water line runs to the refrigerator area. The data gathering instructions generated and presented for step 372 may instruct a user how to determine whether a water line is in the refrigerator area, e.g., by pulling the refrigerator out from the wall and taking a picture in an area behind the refrigerator.

For example, in the kitchen shown in the automated suggestion environment 100 depicted in FIG. 1 the automated suggestion program may determine that the user requests suggestions for replacing the cooking range 120. Besides size checking, the automated suggestion program may know from historically saved information about ranges to learn what the energy source is for the range, e.g., whether the range runs from electricity and/or from a gas source for powering the cooking surfaces/compartments. If the automated suggestion program determines that the energy source is of a type A, then the suggestions for range replacement will be selected from amongst those that may run off of the type A energy source.

In another example, the automated suggestion program may determine that the user requests suggestions for replacing an aerator in a water faucet. In some instances, the sensor data that has been received may indicate what aerator thread type and size is required for the particular water faucet. In some embodiments, the automated suggestion program may determine that the data already received is insufficient to determine the thread type and size for the needed aerator. In such embodiments, the automated suggestion program may cause the compatibility-based suggestion process 360 to proceed through steps 372 and 374 for obtaining more data about the aerator type. The data gathering instructions generated and presented for step 372 may instruct a user how to determine a thread type (e.g., whether a new aerator with threads on an inner surface or on an outer surface is needed) and a size of the aerator (e.g., by asking for additional image photo capturing and/or measurement of the aerator and/or faucet opening). The automated suggestion program may select for a replacement an aerator which has the needed thread type and size for fitting in and operating effectively in the particular water faucet.

For an item replacement for software such as a computer game, the automated suggestion program may determine what graphics capabilities are present on the computer with which the software is being operated. For some computer games, a computer is required to have some advanced graphics capabilities to play the game partially or in its entirety. If the automated suggestion program has no data about the graphics capability of the host computer, the automated suggestion program may cause the compatibility-based suggestion process 360 to proceed through steps 372 and 374 for obtaining more data about the graphics capability. The data gathering instructions generated and presented for step 372 may instruct a user how to access the graphics capabilities for providing same to the automated suggestion program. In some instances, the automated suggestion server 102 will do an application programming interface inquiry to the host computer to learn about the graphics capability.

In a step 378 of the compatibility-based item suggestion process 360, a suggestion to obtain the identified object is presented to the user. The identified object refers to the object that was identified in step 376. This presentation in at least some embodiments may occur in a virtual reality environment so that a visual depiction of the suggested object is shown to the user. FIGS. 4A and 4B which will be described subsequently show examples of presenting in a virtual reality environment one or more objects to a user as a suggestion/recommendation. In other embodiments, other forms of suggestion presentation may occur. For example, the automated suggestion program may generate, as part of the suggestion, text that includes a web link to a website via which the object may be viewed and/or may be requested. The text may be transmitted to a computer associated with the user, e.g., to the smart phone 106 for display on a display screen of the smart phone. In some embodiments, the presentation may occur via generation of audio that speaks the suggested object. An audio file with this suggestion could be transmitted to a computer associated with the user, e.g., to the smart phone 106, to be played by an audio speaker of the smart phone 106. In some embodiments where the automated suggestion server 102 itself is a computer that includes a display screen, an input/output device such as a keyboard, and/or an audio speaker the presentation of the suggestion may occur at the automated suggestion server 102 itself.

After completion of automated suggestion whether via the satisfaction level-based suggestion process 300 shown in FIG. 3A or the compatibility-based suggestion process 360 shown in FIG. 3B, the automated suggestion program may generate insights to help prepare for future automated suggestions for item replacement. The automated suggestion program may use teaching and/or confirmation and/or acceptance of a suggestion by the user to better be able to recognize future requests for item replacement, better able to determine user satisfaction levels, and better be able to recognize data requirements for determining a compatible suggestion. The automated suggestion program may store the learned information for use in future iterations of the automated suggestion processes. In some instances, machine learning models capture the experience by refining neuron weighting and interrelations within the machine learning model.

The automated suggestion program may also determine suggestions for item replacement by performing semantic similarity examination for web-scraped information and the item that is requested to be replaced. Such examination may include generating word embeddings of the item descriptions and submitting the embeddings to a clustering algorithm. The automated suggestion program may in this regard recognize semantic similarity for various types of items. For example, the automated suggestion program may determine that a new type of product with a new name is a suitable and compatible replacement for an earlier type of product and the new type of product may raise satisfaction levels of a user.

Although FIGS. 3A and 3B show the processes ending after the completion of the last step, the data gathering by the senor system may continue and the automated suggestion program may perform additional iterations to continue to monitor when a new item suggestion would be appropriate and/or has been requested.

Machine learning models may be implemented for the various steps of the satisfaction level-based suggestion process 300 shown in FIG. 3A and the compatibility-based suggestion process 360 shown in FIG. 3B such as the activity recognition, recognition of items associated with an activity, determination of user satisfaction levels, determination of satisfaction levels produced for others by potential replacement items, evaluation of data sufficiency for compatibility determination, and compatibility determination for a potential replacement object. Such machine learning models may include naive Bayes models, random decision tree models, linear statistical query models, logistic regression n models, neural network models, e.g. convolutional neural networks, multi-layer perceptrons, residual networks, long short-term memory architectures, algorithms, deep learning models, deep learning generative models, and other models. Training data includes the samples, text information, and/or data of users and items. The learning algorithm, in training the machine learning models in question, finds patterns in input data in order to map the input data attributes to the target. The trained machine learning models contain or otherwise utilize these patterns so that the recommendations and recognition can be predicted for similar future inputs. A machine learning model may be used to obtain predictions on new entries and/or new event preparation. The machine learning model uses the patterns that are identified to determine what the appropriate recognition and generation decisions are for future data to be received and analyzed. As samples are being provided, training of the one or more machine learning models may include supervised learning by submitting prior data sets to an untrained or previously-trained machine learning model. In some instances, unsupervised and/or semi-supervised learning for the one or more machine learning models may also be implemented.

It may be appreciated that FIGS. 3A and 3B provide illustrations of some embodiments and do not imply any limitations with regard to how different embodiments may be implemented. Many modifications to the depicted embodiment(s), e.g. to a depicted sequence of steps, may be made based on design and implementation requirements. Various steps of the satisfaction level-based suggestion process 300 shown in FIG. 3A and the compatibility-based suggestion process 360 shown in FIG. 3B may also be combined for various aspects of the present embodiments, e.g., both compatibility and satisfaction levels may be performed by the automated suggestion program to determine a best suggestion, and additional data gathering instructions may be generated and presented for the satisfaction level-based suggestion process.

FIG. 4A illustrates a first virtual reality environment 402 in which a participant 416 uses a virtual reality headset 418 to experience a first virtual reality experience 404. In the first virtual reality experience 404, items for suggestion for the user are depicted as visual objects for the participant to consider and select. The visual objects that are suggestions for the participant 416 to consider are overlayed as recommendations over a portion of a view of the first virtual reality experience 404. The first virtual reality experience 404 may include a collection of items which the user may consider and in some embodiments purchase for obtaining the item in an online transaction with a provider of the object. FIG. 4A shows a depiction of a refrigerator suggestion 410 that the program has suggested to restore a satisfaction level of the participant 416 and/or that is compatible for replacing a current refrigerator used by the participant 416. The first virtual reality experience 404 may include a virtual reality collection 412 of items, some of which constitute item replacement suggestions personal to the participant 416 and which were identified and suggested by the automated suggestion program.

FIG. 4A also shows a replacement overlay scenario 406 in which a depiction of the refrigerator suggestion 410 is overlayed over a depiction of the first refrigerator 408 which the participant 416 currently uses. Due to this depiction using the replacement overlay scenario 406, the participant 416 is better visually able to see any size differences between the currently used object and the suggested replacement object. In this example, the first virtual reality experience 404 shows that the number one refrigerator suggested for replacing the first refrigerator 408 is slightly wider than the first refrigerator 408. The automated suggestion program may have evaluated available space within the kitchen of the participant 416 to determine that the new refrigerator for the refrigerator suggestion 410 would still fit within the open space of the cabinets (after removal of the first refrigerator 408) without requiring alteration and/or substantial alteration of that environment, e.g., the surrounding cabinets. In some instances, the virtual reality experience may also show the suggested new object in place in the environment of the participant 416. For example, the automated suggestion program generates a virtual reality depiction of the entire kitchen of the participant 416 and shows the suggested object in the position within the kitchen where it would replace the first item. Using these overlays, the participant 416 is better able to see and appreciate how the new item would fit into their environment. The overlaying feature may be especially helpful when a user seeks replacement for a television and would like to compare a size of their current television with a potential replacement television.

The virtual reality headset 418 may include a computer which communicates with the automated suggestion server 102 in order to receive object information to present in the first virtual reality experience 404. The automated suggestion server 102 may communicate with other external servers 422 in order to retrieve information to use for virtual reality display of potential items to obtain and to provide and receive purchase information.

FIG. 4B illustrates a second virtual reality environment display of replacement item suggestions according to at least one embodiment. The second virtual reality environment 462 occurs via the participant 416 using the virtual reality headset 418 to experience a second virtual reality experience 464. In the second virtual reality experience 464, items for suggestion for the user are depicted as visual objects for the participant to consider and select. Multiple visual objects that are suggestions for the participant 416 to consider are presented, e.g., displayed in a row 466. Due to this virtual reality presentation, the participant may perform side-by-side comparison of various possible items to select to replace a current item. FIG. 4B shows one example of depictions of a first suggested refrigerator 472, a second suggested refrigerator 474, and a third suggested refrigerator 476 presented in the row 466 for facilitating comparison by the participant 416.

Additionally, FIG. 4B shows that an object analysis with textual information may be presented overlayed over the depiction. FIG. 4B shows that a refrigerator comparison analysis 468 is displayed in the second virtual reality experience 464 directly over the depiction of the first suggested refrigerator 472. Although only one comparison analysis is shown in FIG. 4B, in other embodiments some or all of the items presented for consideration by the participant 416 may have their own analysis presented upon themselves in an overlaid manner. The analysis may in some embodiments include a respective user satisfaction level for the particular product that was determined based on the information retrieved from online sources. The comparison analysis such as the refrigerator comparison analysis 468 may in some embodiments include a capability comparison of at least one capability and/or functionality of the first suggested refrigerator 472 to the refrigerator that is to be replaced. The written comparison analysis such as the refrigerator comparison analysis 468 may in some embodiments include a size comparison of the size of the first suggested refrigerator 472 compared to the refrigerator that is to be replaced. In some embodiments the user can ask the automated suggestion program to filter the contents displayed in the virtual reality environment so that only objects are shown which are already available for acquisition. The automated suggestion program may also filter the displayed objects to not show certain objects which the user already has in possession so that the user may not waste any time looking at those objects for potential acquisition.

It may be appreciated that FIGS. 4A and 4B provide illustrations of some embodiments and do not imply any limitations with regard to how different embodiments may be implemented. Many modifications to the depicted embodiment(s), e.g., the visual features shown, may be made based on design and implementation requirements. Various features of the first virtual reality environment 402 shown in FIG. 4A may be combined with the features of the second virtual reality environment 462 shown in FIG. 4B and vice-versa in a single virtual reality experience.

In some embodiments, the automated suggestion program may perform evaluation of a current stock of items at a place commonly occupied by a user. The automated suggestion system may also evaluate user generated messages and information on any product such as likes, dislikes, and/or feedback provided about any product by the current user or some other user. In some embodiments, digital twin simulation of any product the user has is overlaid over virtual reality shopping content, so that the user can effectively shop for comparable items from virtual reality-based shopping. In virtual reality-based shopping, the user can access an entire retail store in the virtual reality surroundings. The user can navigate to and through the virtual reality world and perform shopping including the user virtually interacting with a product and selecting a product for acquisition, e.g., by virtually placing the depiction of the object into a virtual shopping cart. Sensors associated with a virtual reality headset may recognize movements and/or the voice of the user to follow directions in the virtual setting according to the user instructions. While performing grocery shopping, the user can select the appropriate brand based on personal choice and keep the selected product in the shopping cart. At the same time, the user also may have different types of grocery items at home, like on the shelf and/or in a refrigerator.

While performing virtual reality shopping, the user may not know all of the relevant information about the current stock, e.g., number, of various items held by the user. Even though a shopping list can be created, generating and using a shopping list can feel burdensome to a user who has to always refer to the shopping list and select the required quantity of items. The present embodiments may include enhancing object acquisition via use of a virtual reality setting and the virtual reality overlaying of user-specific and item-specific information such as current stock that the user has at home and/or work. User-specific appropriate messages about any product such as likes and/or dislikes may be overlaid for a virtual depiction over other shopping content in a virtual world. This overlaying helps the user perform object acquisition.

While creating optimum virtual reality-based shopping environment, the automated suggestion system may consider a quantity of available stock of different products at home of a user and compare to predicted demand and/or need of the user. A problem may be identified based on user indications captured by sensors. Information may be captured during any shopping cycle. The automated suggestion program may evaluate to determine a product to solve a problem of a user. The sentiment of the user for a product such as the user did not like the product, found the product to be too spicy, etc. may be captured from various sensors such as wearable, physiological sensors, a brain-computer interface, and/or with passive listening (e.g., during object usage, television watching, and/or listening to a message), etc. The user sentiment may be overlaid over the products displayed on the virtual reality shopping environment, so that the user can better understand which products are to be purchased from virtual reality based shopping to fulfill the user needs.

The automated suggestion program in some embodiments may receive voice data, find product information from the voice data, and associate the product information with a particular product. Such voice data may be captured by an automated assistant that is used by the user. Accordingly while interacting with virtual reality-based shopping, the present embodiments may associate textual messages of different products in the virtual reality environment, so that the user can better make object acquisition decisions during virtual reality-based shopping. When an object is being used such as during cooking, eating, and/or another activity, the automated suggestion program in some embodiments tracks physiological feedback from the user, e.g., from wearable device-based physiological sensors that generate feedback. The automated suggestion program interprets the physiological feedback to determine a user sentiment for a used object. The user sentiment may subsequently be presented over a depiction of the object in a virtual reality environment, e.g., in a virtual reality shopping environment. Thus, the present embodiments may help a user make appropriate object acquisition decisions, e.g., in a virtual reality environment.

In some embodiments the automated suggestion program performs digital twin simulation of the objects that the user has, e.g., a washing machine, microwave oven, etc. . . . The digital twin simulation of the respective object will be overlaid over the depiction of the object displayed in the virtual reality environment. This overlaying helps the user decide if the user can successfully replace the currently-owned/installed object with the new object. The overlaying may include comparing the cost of ownership and capabilities between the object at home and the new object that is a potential replacement. Based on various sensed data such as data from wearable sensors and Internet-of-Things sensors, emotion and a satisfaction level of a user may be identified/determined based on a particular activity and an undertaken activity. The automated suggestion program may in an automated manner determine and simulate which new product may restore a satisfaction level of a user and/or can solve a problem. A depiction of the identified helper object may be presented in an overlaid manner in a virtual reality environment to facilitate suggesting to the user to obtain the new product.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 shown in FIG. 5 contains an example of an environment for the execution of at least some of the computer code involved in performing the inventive methods, such as item replacement suggestion program 518. The references in the present disclosure to automated suggestion program may refer to the item replacement suggestion program 518. In addition to item replacement suggestion program 518, computing environment 500 includes, for example, client computer 502, wide area network (WAN) 530, end user device (EUD) 580, remote server 560, public cloud 570, and private cloud 590. In this embodiment, computer 502 includes processor set 510 (including processing circuitry 511 and cache 513), communication fabric 512, volatile memory 514, persistent storage 516 (including operating system 519 and item replacement suggestion program 518, as identified above), peripheral device set 522 (including user interface (UI) device set 523, storage 524, and Internet of Things (IoT) sensor set 525), and network module 515. Remote server 560 includes remote database 566. Public cloud 570 includes gateway 572, cloud orchestration module 574, host physical machine set 576, virtual machine set 577, and container set 578.

COMPUTER 502 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 566. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 502, to keep the presentation as simple as possible. Computer 502 may be located in a cloud, even though it is not shown in a cloud in FIG. 5. On the other hand, computer 502 is not required to be in a cloud except to any extent as may be affirmatively indicated.

PROCESSOR SET 510 includes one, or more, computer processors of any type now known or to be developed in the future. Processing circuitry 511 may be distributed over multiple packages, for example, multiple, coordinated integrated circuit chips. Processing circuitry 511 may implement multiple processor threads and/or multiple processor cores. Cache 513 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 502 to cause a series of operational steps to be performed by processor set 510 of computer 502 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 513 and the other storage media discussed below. The program instructions, and associated data, are accessed by processor set 510 to control and direct performance of the inventive methods. In computing environment 500, at least some of the instructions for performing the inventive methods may be stored in item replacement suggestion reminding program 518 in persistent storage 516.

COMMUNICATION FABRIC 512 is the signal conduction path that allows the various components of computer 502 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 514 is any type of volatile memory now known or to be developed in the future. Examples include dynamic type random access memory (RAM) or static type RAM. Typically, volatile memory 514 is characterized by random access, but this is not required unless affirmatively indicated. In computer 502, the volatile memory 514 is located in a single package and is internal to computer 502, but, alternatively or additionally, the volatile memory may be distributed over multiple packages and/or located externally with respect to computer 502.

PERSISTENT STORAGE 516 is any form of non-volatile storage for computers that is now known or to be developed in the future. The non-volatility of this storage means that the stored data is maintained regardless of whether power is being supplied to computer 502 and/or directly to persistent storage 516. Persistent storage 516 may be a read only memory (ROM), but typically at least a portion of the persistent storage allows writing of data, deletion of data and re-writing of data. Some familiar forms of persistent storage include magnetic disks and solid state storage devices. Operating system 519 may take several forms, such as various known proprietary operating systems or open source Portable Operating System Interface-type operating systems that employ a kernel. The code included in item replacement suggestion program 518 typically includes at least some of the computer code involved in performing the inventive methods.

PERIPHERAL DEVICE SET 522 includes the set of peripheral devices of computer 502. Data communication connections between the peripheral devices and the other components of computer 502 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 502 is required to have a large amount of storage (for example, where computer 502 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 502 to communicate with other computers through WAN 530. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 502 from an external computer or external storage device through a network adapter card or network interface included in network module 515.

WAN 530 is any wide area network (for example, the internet) capable of communicating computer data over non-local distances by any technology for communicating computer data, now known or to be developed in the future. In some embodiments, the WAN 530 may be replaced and/or supplemented by local area networks (LANs) designed to communicate data between devices located in a local area, such as a Wi-Fi network. The WAN 530 and/or LANs typically include computer hardware such as copper transmission cables, optical transmission fibers, wireless transmission, routers, firewalls, switches, gateway computers and edge servers.

END USER DEVICE (EUD) 580 is any computer system that is used and controlled by an end user (for example, a customer of an enterprise that operates computer 502) and may take any of the forms discussed above in connection with computer 502. EUD 580 typically receives helpful and useful data from the operations of computer 502. For example, in a hypothetical case where computer 502 is designed to provide a recommendation to an end user, this recommendation would typically be communicated from network module 515 of computer 502 through WAN 530 to EUD 580. In this way, EUD 580 can display, or otherwise present, the recommendation to an end user. In some embodiments, EUD 580 may be a client device, such as thin client, heavy client, mainframe computer, desktop computer and so on.

REMOTE SERVER 560 is any computer system that serves at least some data and/or functionality to computer 502. Remote server 560 may be controlled and used by the same entity that operates computer 502. Remote server 560 represents the machine(s) that collect and store helpful and useful data for use by other computers, such as computer 502. For example, in a hypothetical case where computer 502 is designed and programmed to provide a recommendation based on historical data, then this historical data may be provided to computer 502 from remote database 566 of remote server 560.

PUBLIC CLOUD 570 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 570 is performed by the computer hardware and/or software of cloud orchestration module 574. The computing resources provided by public cloud 570 are typically implemented by virtual computing environments that run on various computers making up the computers of host physical machine set 576, which is the universe of physical computers in and/or available to public cloud 570. The virtual computing environments (VCEs) typically take the form of virtual machines from virtual machine set 577 and/or containers from container set 578. It is understood that these VCEs may be stored as images and may be transferred among and between the various physical machine hosts, either as images or after instantiation of the VCE. Cloud orchestration module 574 manages the transfer and storage of images, deploys new instantiations of VCEs and manages active instantiations of VCE deployments. Gateway 572 is the collection of computer software, hardware, and firmware that allows public cloud 570 to communicate through WAN 530.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 590 is similar to public cloud 570, except that the computing resources are only available for use by a single enterprise. While private cloud 590 is depicted as being in communication with WAN 530, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 570 and private cloud 590 are both part of a larger hybrid cloud.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, via a first computer, first data from a first sensor associated with a first user, wherein to generate the first data the first sensor senses a first activity being performed in real-time by the first user;
   analyzing via artificial intelligence the first data and thereby determining that:
      a first object is associated with the first activity, and
      a satisfaction level of the first user for the first activity is below a pre-determined threshold level;
   in response to the satisfaction level being below the pre-determined threshold level, generating, via the first computer and via the artificial intelligence, a first recommendation for a replacement object for the first user, the generating being based on the first data, the first recommendation indicating ability of the replacement object to replace the first object; and transmitting, via the first computer, the first recommendation for presentation to the first user, wherein the presentation comprises a virtual reality display of the first recommendation, the virtual reality display comprising overlaying the first recommendation over a portion of a view of a virtual reality collection of items.

2. The method of claim 1, wherein the first recommendation comprises a depiction of the replacement object and the depiction is overlayed over the portion of the view of the virtual reality collection of items.

3. The method of claim 2, wherein the depiction of the replacement object is overlayed over a depiction of the first object.

4. The method of claim 1, wherein the generating the first recommendation comprises:
analyzing the first data to generate a digital specification of the first object; and
comparing the digital specification to the replacement object to determine the ability of the replacement object to replace the first object.

5. The method of claim 4, wherein the first recommendation comprises an analysis of compatibility of the replacement object with surroundings of the first object such that the replacement object is able to replace the first object in the surroundings.

6. The method of claim 5, wherein the compatibility includes at least one member selected from a group consisting of physical compatibility and electrical compatibility.

7. The method of claim 5, wherein the ability of the replacement object to replace the first object includes replaceability without requiring alteration to the surroundings that receive the replacement object.

8. The method of claim 1, wherein:
the generating the first recommendation comprises determining a user satisfaction level of the replacement object; and
the generating the first recommendation is based on the user satisfaction level that is associated with the replacement object exceeding the determined satisfaction level of the first user.

9. The method of claim 1, wherein the first sensor comprises a camera.

10. The method of claim 1, wherein the first recommendation further comprises a comparison analysis that compares the replacement object to the first object.

11. The method of claim 10, wherein the comparison analysis comprises a capability comparison of at least one capability of the replacement object to at least one capability of the first object.

12. A computer system comprising:
one or more processors, one or more computer-readable tangible storage media, and program instructions stored on at least one of the one or more computer-readable tangible storage media for execution by at least one of the one or more processors to cause the computer system to:
receive first data from a first sensor associated with a first user, wherein to generate the first data the first sensor senses a first activity being performed in real-time by the first user;
analyze via artificial intelligence the first data and thereby determine that:
a first object is associated with the first activity, and
a satisfaction level of the first user for the first activity is below a pre-determined threshold level;
in response to the satisfaction level being below the pre-determined threshold level, generate, via the artificial intelligence, a first recommendation for a replacement object for the first user, the generating being based on the first data, the first recommendation indicating ability of the replacement object to replace the first object; and
transmit the first recommendation for presentation to the first user, wherein the presentation comprises a virtual reality display of the first recommendation, the virtual reality display comprising overlaying the first recommendation over a portion of a view of a virtual reality collection of items.

13. The computer system of claim 12, wherein the generating the first recommendation comprises analyzing the first data to generate a digital specification of the first object and comparing the digital specification to the replacement object to determine the ability of the replacement object to replace the first object.

14. The computer system of claim 12, wherein:
the generating the first recommendation comprises determining a user satisfaction level of the replacement object; and
the generating the first recommendation is based on the user satisfaction level that is associated with the replacement object exceeding the determined satisfaction level of the first user.

15. The computer system of claim 12, wherein the first recommendation comprises a depiction of the replacement object and the depiction is overlayed over the portion of the view of the virtual reality collection of items.

16. A computer program product comprising a computer-readable storage medium having program instructions embodied therewith, the program instructions being executable by a computer to cause the computer to:
receive first data from a first sensor associated with a first user wherein to generate the first data the first sensor senses a first activity being performed in real-time by the first user;
analyzing via artificial intelligence the first data and thereby determining that:
a first object is associated with the first activity, and
a satisfaction level of the first user for the first activity is below a pre-determined threshold level;
in response to the satisfaction level being below the pre-determined threshold level, generate, via the artificial intelligence, a first recommendation for a replacement object for the first user, the generating being based on the first data, the first recommendation indicating ability of the replacement object to replace the first object; and
transmit the first recommendation for presentation to the first user, wherein the presentation comprises a virtual reality display of the first recommendation, the virtual reality display comprising overlaying the first recommendation over a portion of a view of a virtual reality collection of items.

17. The computer program product of claim 16, wherein the generating the first recommendation comprises analyzing the first data to generate a digital specification of the first object and comparing the digital specification to the replacement object to determine the ability of the replacement object to replace the first object.

18. The computer program product of claim 16, wherein:

the generating the first recommendation comprises determining a user satisfaction level of the replacement object; and the generating the first recommendation is based on the user satisfaction level that is associated with the replacement object exceeding the determined satisfaction level of the first user.

19. The computer program product of claim 16, wherein the first recommendation comprises a depiction of the replacement object and the depiction is overlayed over the portion of the view of the virtual reality collection of items.

20. The computer program product of claim 19, wherein the depiction of the replacement object is overlayed over a depiction of the first object.

* * * * *